United States Patent [19]
Akada et al.

[11] Patent Number: 5,689,746
[45] Date of Patent: Nov. 18, 1997

[54] AMOUNT-OF-LIGHT ADJUSTING DEVICE

[75] Inventors: Hiroshi Akada; Tatsuo Chigira; Hironori Takano, all of Kanagawa-ken; Masahiko Tsuzuki, Saitama-ken, all of Japan

[73] Assignee: Canon Kabushiki Kaisha, Tokyo, Japan

[21] Appl. No.: 287,875

[22] Filed: Aug. 9, 1994

[30] Foreign Application Priority Data

| Aug. 13, 1993 | [JP] | Japan | 5-201372 |
| Feb. 24, 1994 | [JP] | Japan | 6-026690 |
| Feb. 24, 1994 | [JP] | Japan | 6-026691 |
| Feb. 28, 1994 | [JP] | Japan | 6-030428 |

[51] Int. Cl.$^6$ .................................................. G03B 9/02
[52] U.S. Cl. ............................ 396/508; 396/451; 396/505
[58] Field of Search ...................... 354/271.1, 234.1; 396/259, 260, 449, 451, 505, 508, 510

[56] References Cited

U.S. PATENT DOCUMENTS

| 4,897,681 | 1/1990 | Yamamoto et al. | 354/271.1 |
| 5,072,162 | 12/1991 | Sato et al. | 318/268 |
| 5,117,137 | 5/1992 | Kobayashi | 310/49 R |
| 5,237,357 | 8/1993 | Morisawa | 354/230 |
| 5,371,633 | 12/1994 | Kawamura et al. | 359/739 |
| 5,418,588 | 5/1995 | Chigira | 354/234.1 |
| 5,430,519 | 7/1995 | Shimada et al. | 354/271.1 |

FOREIGN PATENT DOCUMENTS

| 329837 | 3/1991 | Japan | 37/16 |

*Primary Examiner*—A. A. Mathews
*Attorney, Agent, or Firm*—Robin, Blecker, Daley and Driscoll

[57] ABSTRACT

To reduce the size of an optical apparatus having an amount-of-light adjusting device, there is provided an arrangement which comprises a light-blocking member arranged to move to vary a light-blocking area and a drive part for driving the light block member. The drive part includes a stator formed by a first stator piece having a first stator pole and a second stator piece having a second stator pole and a rotor made eccentric with respect to a central position of the first stator piece and the second stator piece. The drive part is disposed rearward of the light-blocking member in the direction of the optical axis.

27 Claims, 23 Drawing Sheets

5,689,746

1

AMOUNT-OF-LIGHT ADJUSTING DEVICE

BACKGROUND OF THE INVENTION

1. Field of the Invention

The present invention relates to an amount-of-light adjusting device utilizing a stepping motor.

2. Description of the Related Art

Amount-of-light adjusting devices of the electromagnetically driven type in which diaphragm blades are driven by an electromagnetically driven type of actuator have currently been incorporated in photographic apparatus such as video cameras or still cameras, and have been used in a wide range of applications. In such an electromagnetic driven type of amount-of-light adjusting device, the rotational position of a permanent-magnet type of rotor which constitutes part of the electromagnetic driven type of actuator for driving the diaphragm blades is detected by a magnetism-sensitive type detecting element such as a Hall element. On the basis of the detected rotational position, the positions of the diaphragm blades, i.e., the size of the aperture of the amount-of-light adjusting device, is detected, and the positions of the diaphragm blades are controlled.

As disclosed in, for example, Japanese Laid-Open Utility Model Application No. Hei 3-29837, the driving part of such an amount-of-light adjusting device is provided with a rotor having a plurality of permanent magnets around its periphery, a stator having a plurality of pole portions opposed to the periphery of the rotor, and a coil which is energized to produce magnetic poles in the respective pole portions of the stator. The stator is formed in an approximately U-like shape having two linear portions, and the coil is fitted onto either one of the linear portions.

SUMMARY OF THE INVENTION

One object of the present invention is to provide an optical apparatus having a reduced size.

To achieve the above object, in accordance with one aspect of the present invention, there is provided an arrangement which comprises a light-blocking member arranged to move to vary a light-blocking area and drive means for driving the light-blocking member. The drive means includes a stator formed by a first stator piece having a first stator pole and a second stator piece having a second stator pole and a rotor disposed at an eccentric position deviated from a central position of the first stator piece and the second stator piece. The drive means is disposed rearward of the light-blocking member in the direction of the optical axis.

Another object of the present invention is to provide an amount-of-light adjusting device which is easy to assemble.

To achieve the above object, in accordance with another aspect of the present invention, there is provided an arrangement which comprises a plurality of light-blocking members arranged to move to vary a light-blocking area of an opening, a drive unit for driving the plurality of light-blocking members, and a support member for supporting the plurality of light-blocking members and the drive unit. After the plurality of light-blocking members have been supported by the support member, the plurality of light-blocking members are moved by their own weights to a position at which they can be connected to the drive unit.

The above and other objects, features and advantages of the present invention will become apparent from the following detailed description of preferred embodiments of the present invention, taken in conjunction with the accompanying drawings.

DETAILED DESCRIPTION OF THE PREFERRED EMBODIMENTS

Figure 1:
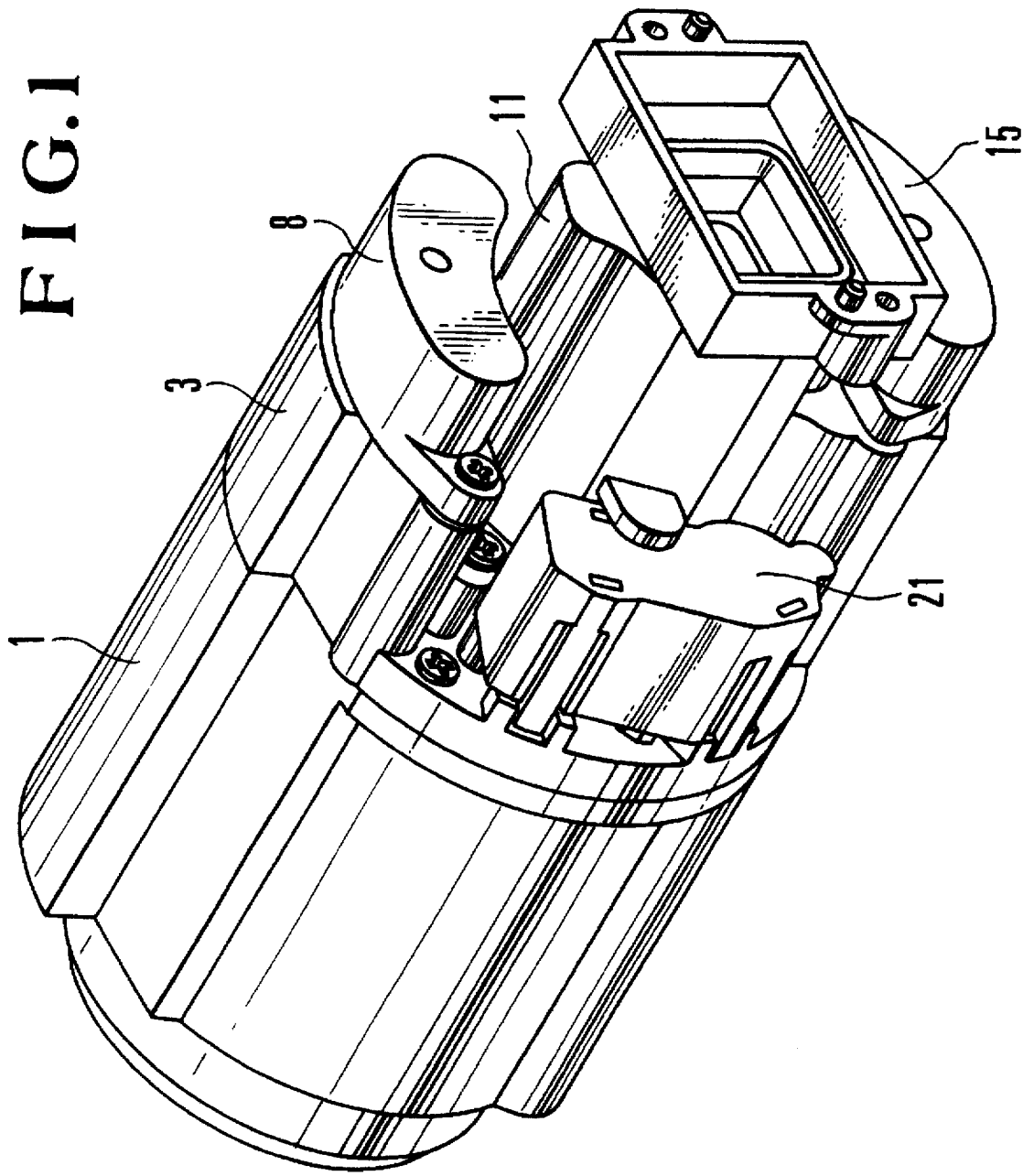
FIG. 1 is a diagrammatic perspective view of a lens unit to which the present invention is applied.
Figure 2:
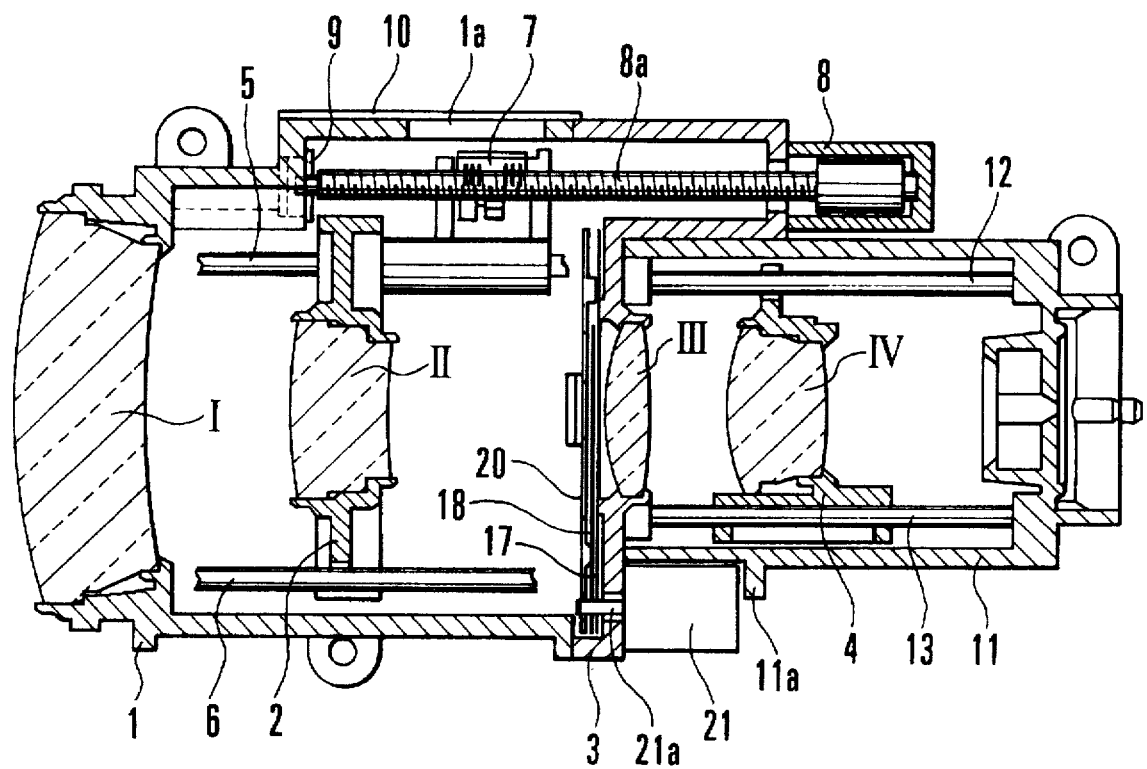
FIG. 2 is a cross-sectional view of the essential portion of the lens unit to which the present invention is applied.
Figure 3:
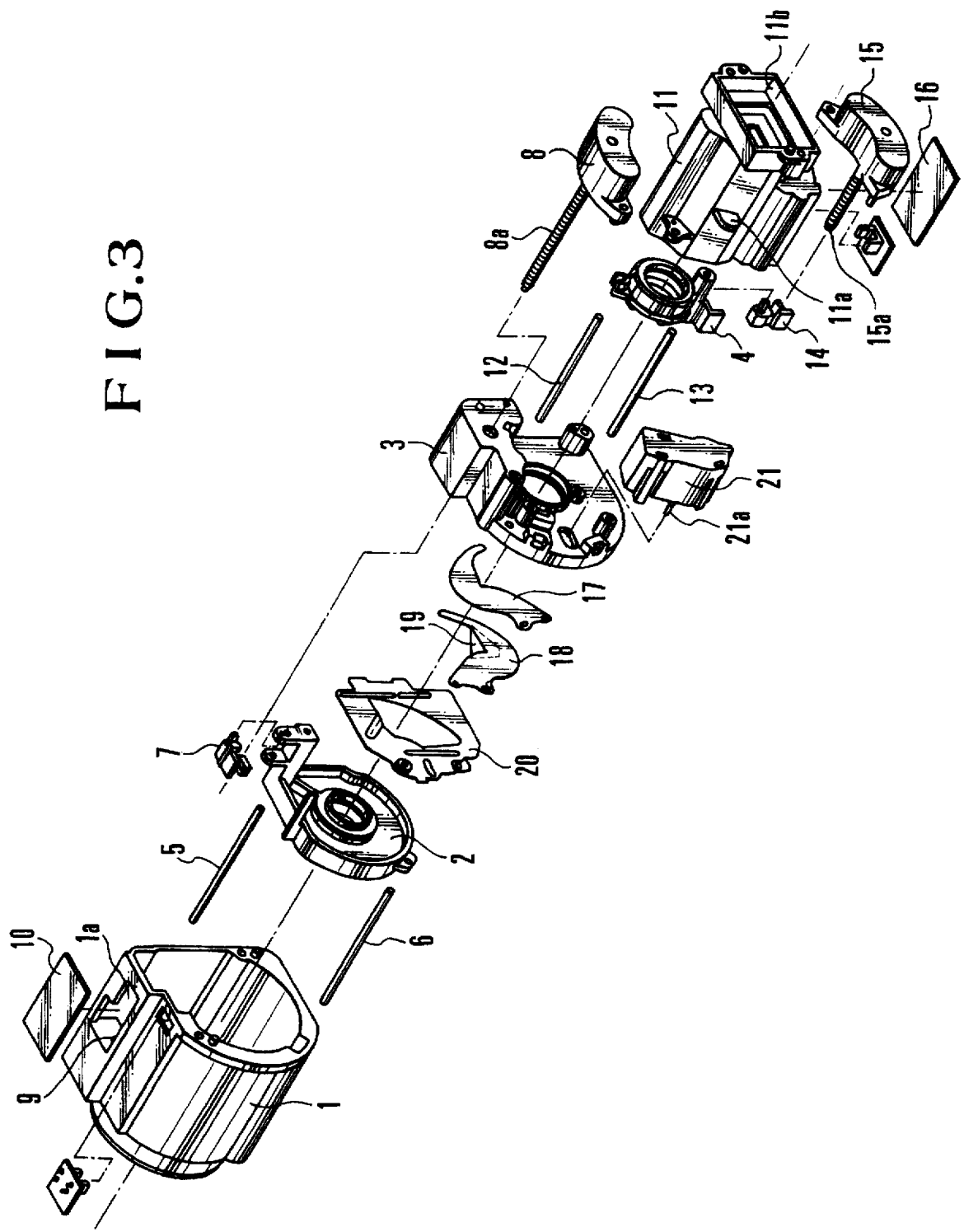
FIG. 3 is a diagrammatic, exploded perspective view of the lens unit to which the present invention is applied.
Figure 4:
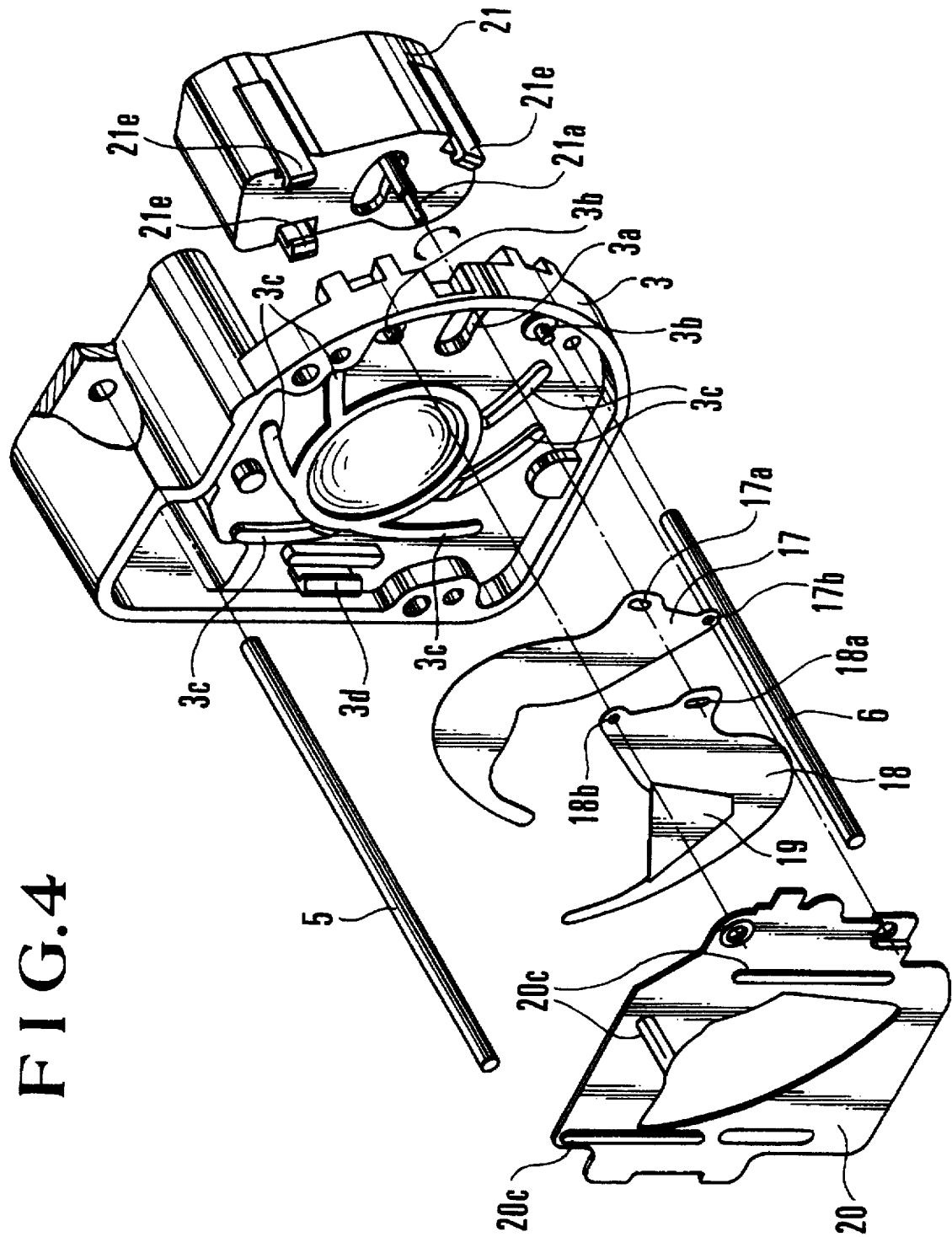
FIG. 4 is a diagrammatic, exploded perspective view of an amount-of-light adjusting device to which the present invention is applied.
Figure 5:
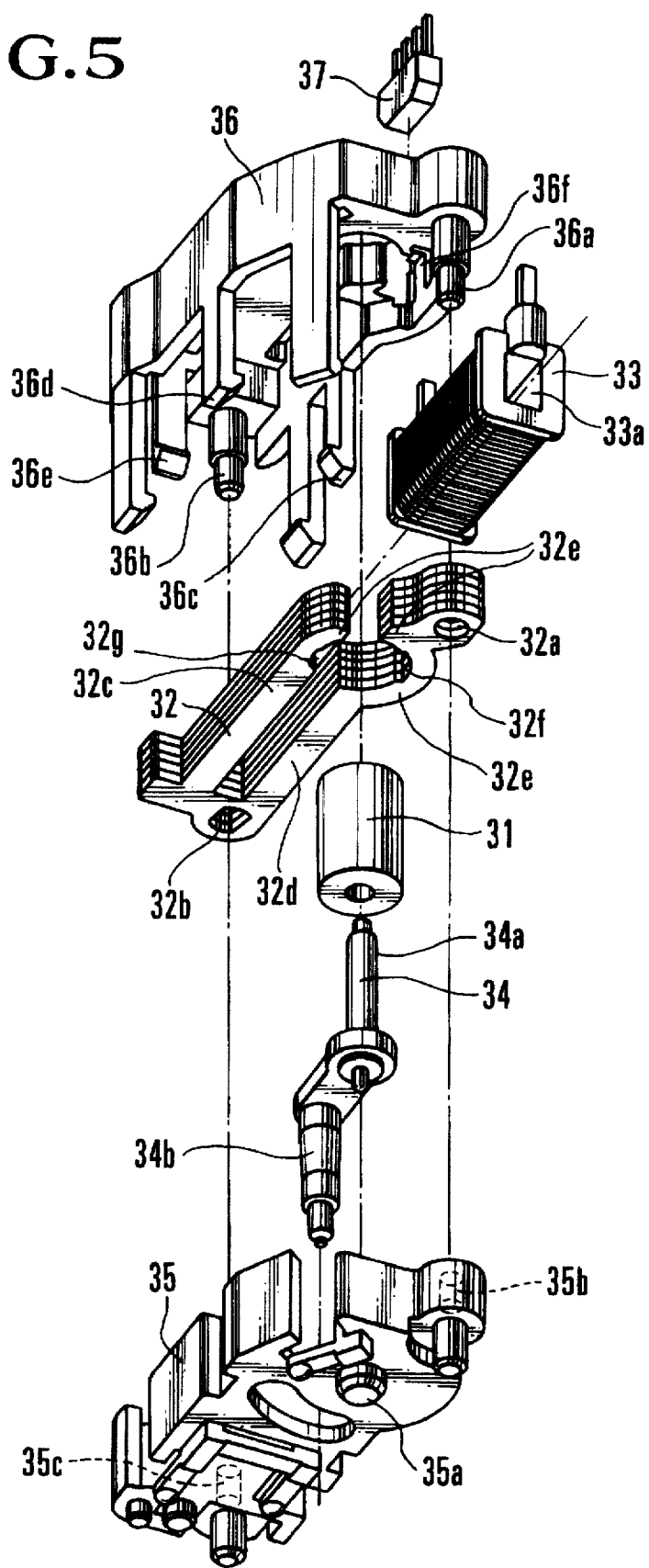
FIG. 5 is a diagrammatic, exploded perspective view of the driving part of the amount-of-light adjusting device to which the present invention is applied.
Figure 6:
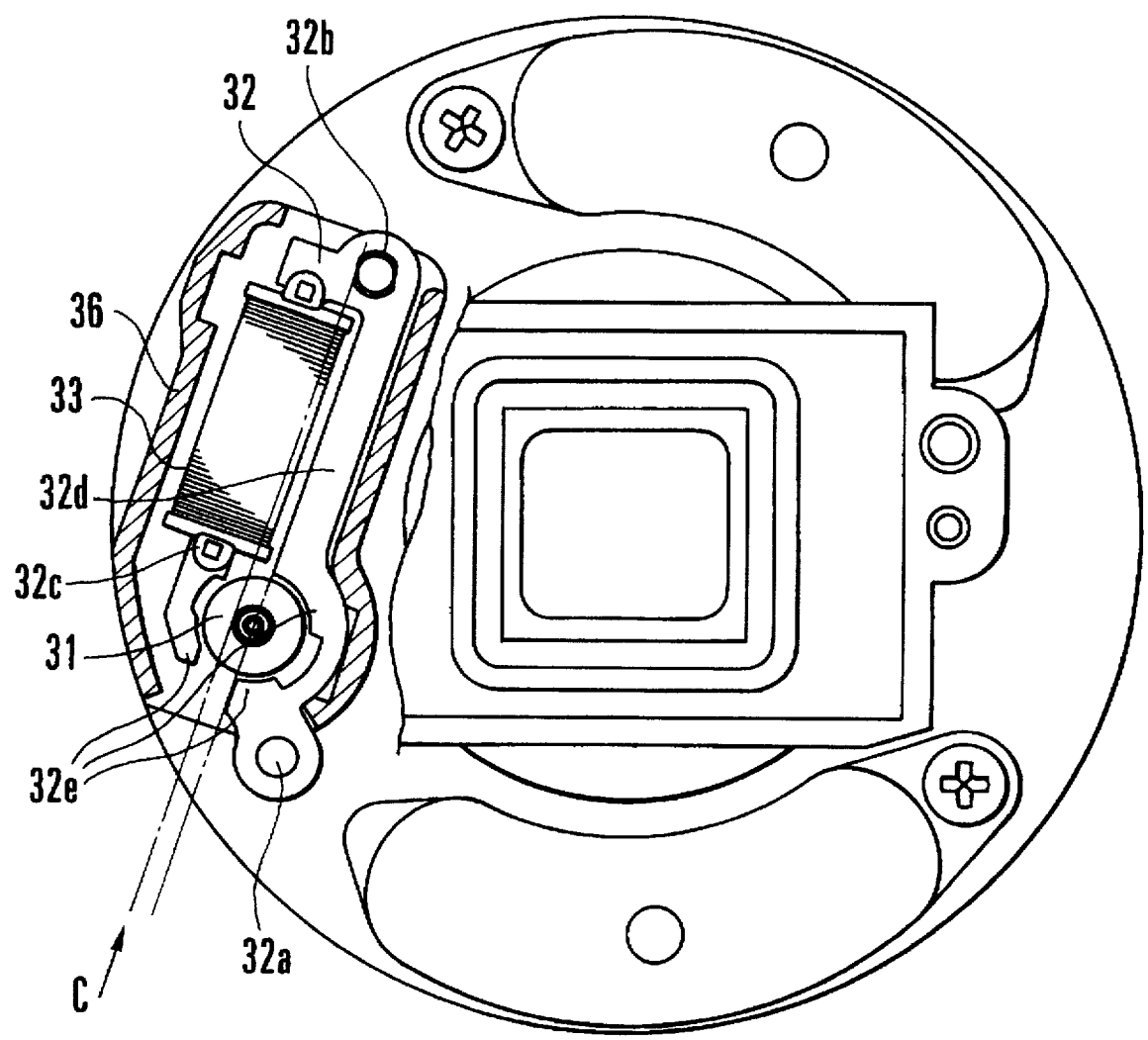
FIG. 6 is a fragmentary, cross-sectional view of the amount-of-light adjusting device according to the present invention as viewed from the rear of the lens unit.
Figure 7A:
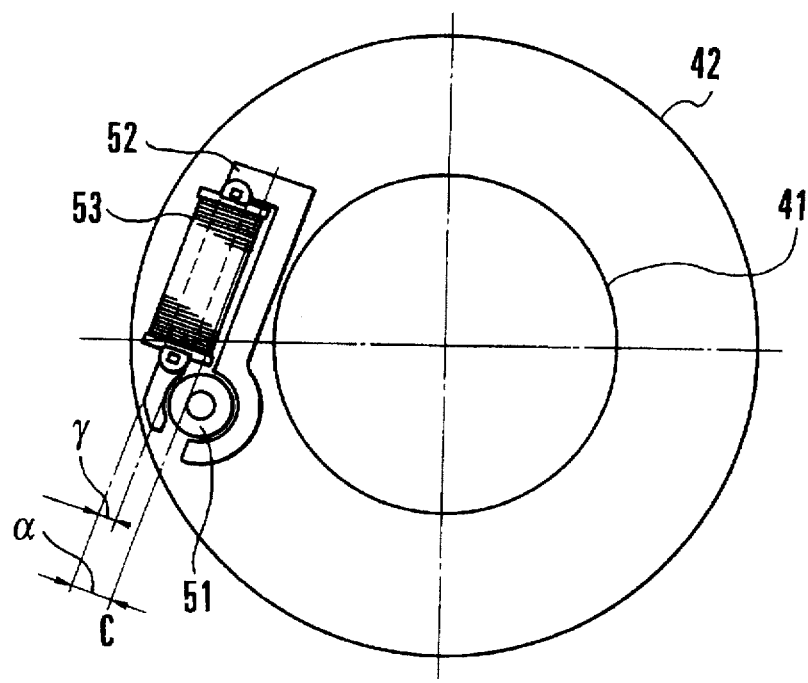
FIGS. 7(a) and 7(b) are schematic views respectively showing a state in which the driving part of the amount-of-light adjusting device according to the present invention is disposed on a lens barrel and a state in which a conventional driving part is disposed on a lens barrel.
Figure 7B:
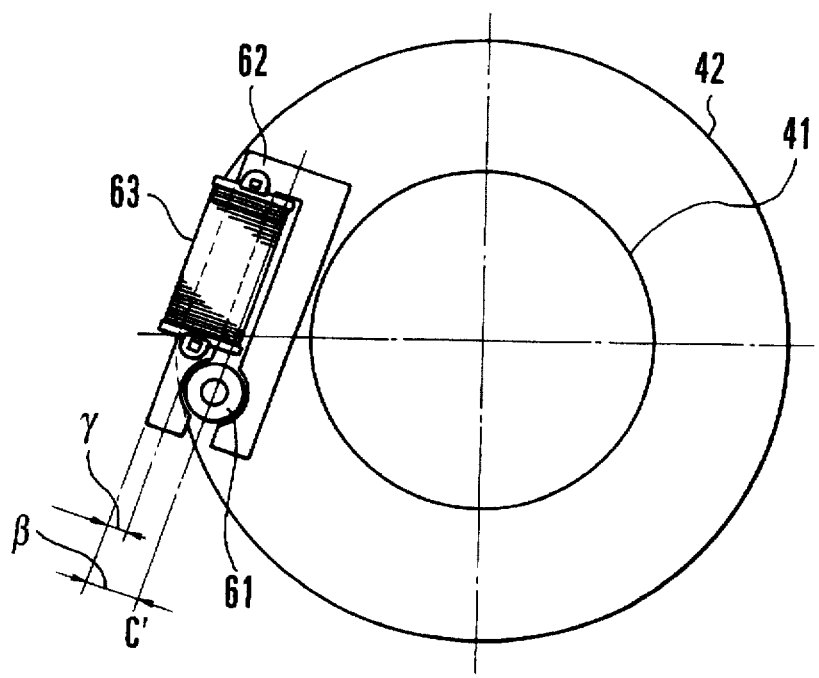

FIG. 1 is a diagrammatic perspective view of a lens unit to which the present invention is applied, FIG. 2 is a cross-sectional view of the essential portion of the lens unit to which the present invention is applied, FIG. 3 is a diagrammatic, exploded perspective view of the lens unit, FIG. 4 is a diagrammatic, exploded perspective view of the amount-of-light adjusting device shown in FIG. 3, FIG. 5 is a diagrammatic, exploded perspective view of the driving part of the amount-of-light adjusting device to which the present invention is applied, FIG. 6 is a fragmentary, cross-sectional view of the amount-of-light adjusting device according to the present invention as viewed from the rear of the lens unit, and FIGS. 7(a) and 7(b) are schematic comparative views respectively showing a state in which the driving part of the amount-of-light adjusting device according to the present invention is disposed on a lens barrel and a state in which a conventional driving part is disposed on a lens barrel.

First of all, the construction of the lens unit will be described below with reference to FIGS. 2 and 3.

The lens unit shown in FIGS. 2 and 3 includes a first lens holding member 1 for holding a first lens group I, a second lens holding member 2 for holding a second lens group II, a third lens holding member 3 for holding a third lens group III, and a fourth lens holding member 4 for holding a fourth lens group IV. The first lens group I and the third lens group III are fixed lens groups, the second lens group II is a moving lens group which performs a zooming operation, and the fourth lens group IV is a moving lens group which performs a focusing operation.

The second lens holding member 2 is held by first guide bars 5 and 6 in such a manner as to be slidable along the optical axis of the lens unit, and each of the first guide bars 5 and 6 is supported at one end by the first lens holding member 1 and at the other end by the third lens holding member 3. A rack member 7 which is supported by the second lens holding member 2 is meshed with a screw thread shaft 8a of a zooming motor 8 of arcuate shape which is fixed to the third lens holding member 3. The rack member 7 is arranged to move the second lens holding member 2 along the optical axis in accordance with the rotation of the screw thread shaft 8a of the zooming motor 8.

The distal end of the screw thread shaft 8a is rotatably supported by a bearing 9 provided on the first lens holding member 1.

The first lens holding member 1 has an opening 1a to be used for performing a visual check while incorporating the screw thread shaft 8a to mesh it with the rack member 7. After the screw thread shaft 8a has been incorporated, the opening 1a is completely covered with a cover 10.

The fourth lens holding member 4 is held by second guide bars 12 and 13 in such a manner as to be movable along the optical axis. Each of the second guide bars 12 and 13 is supported at one end by the third lens holding member 3 and at the other end by a rear fixed lens barrel 11 having an image sensor mounting part 11b.

Referring to FIG. 3, a rack member 14 which is supported by the fourth lens holding member 4 is meshed with a screw thread shaft 15a of a focusing motor 15 of arcuate shape which is fixed to the rear fixed lens barrel 11. The rack member 14 is arranged to move the fourth lens holding member 4 along the optical axis in accordance with the rotation of the screw thread shaft 15a of the focusing motor 15. Similarly to the screw thread shaft 8a of the zooming motor 8, the distal end of the screw thread shaft 15a is rotatably supported by a bearing (not shown) provided on the rear fixed lens barrel 11. An opening (not shown) is provided in the rear fixed lens barrel 11 to be used for performing a visual check while incorporating the screw thread shaft 15a to mesh it with the rack member 14. After the screw thread shaft 15a has been incorporated, the opening is completely covered with a cover 16.

As shown in FIG. 3, the lens unit includes diaphragm blades 17 and 18, and an ND filter 19 for reducing the amount of light to be transmitted is attached to the diaphragm blade 18. The diaphragm blades 17 and 18 are sandwiched between a blade pressure plate 20 and the third lens holding member 3, and are driven by the turning motion of a driving arm 21a of a driving part 21 of the amount-of-light adjusting device, as indicated by the double-headed arrow shown adjacent to the driving arm 21a in FIG. 4.

The construction of the amount-of-light adjusting device will be described below with reference to FIG. 4.

FIG. 4 is a diagrammatic, exploded perspective view showing the amount-of-light adjusting device according to the first embodiment of the present invention. The diaphragm blades 17 and 18 have round holes 17b and 18b, respectively, and two guide pins 3b which are provided integrally with the third lens holding member 3 are inserted into the round holes 17b and 18b, respectively. The diaphragm blades 17 and 18 also have slots 17a and 18a, respectively, and the driving arm 21a of the driving part 21 is inserted through the slots 17a and 18a via an opening 3a. The blade pressure plate 20 is held by being snap-fitted into a claw portion 3d provided on the third lens holding member 3, and the diaphragm blades 17 and 18 turn in their respective directions perpendicular to the optical axis in accordance with the motion of the driving arm 21a, thereby reducing the flux of light.

During this turning motion, the diaphragm blades 17 and 18 can smoothly operate without having contact with each other, owing to guide rails 3c, which are provided integrally with the third lens holding member 3, and guide rails 20c, which are provided integrally with the blade pressure plate 20. The driving part 21 is fixed to the third lens holding member 3 by fitting (snap-fitting) a plurality of claw portions 21e provided on the external portion of the driving part 21 into the corresponding hooking portions (not shown) of the third lens holding member 3. As shown in FIG. 3, a projection 11a which projects from the rear fixed lens barrel 11 is provided at a location rearward of the driving part 21, i.e., on the side of the driving part 21 which is opposite to the face thereof fixed to the third lens holding member 3. The size of the projection 11a is selected so that even if a shock is accidentally applied in the direction of the optical axis, the projection 11a can come into abutment with the projection 11a of the rear fixed lens barrel 11 and serve as a stopper to prevent the claw portions 21e of the driving part 21 from coming off the third lens holding member 3.

FIG. 5 is a diagrammatic, exploded perspective view showing the driving part 21 of the amount-of-light adjusting device according to the first embodiment.

The driving part 21 shown in FIG. 5 includes a rotor 31 which is magnetized to have two poles (which is mainly magnetized in a direction perpendicular to the axis of the rotor 31), and a stator 32 made from a magnetic material such as a silicon steel sheet. The stator 32 has two stator arms 32c and 32d in the form of an arm 32c and 32d, a rotor-opposed portion 32e (stator pole), and positioning holes 32a and 32b. Grooves 32f and 32g for implementing the performance of the amount-of-light adjusting device are respectively formed like cutouts adjacently to the rotor-opposed portion 32e (stator pole) of the stator 32. A bobbin 33 is formed of resin and has a hole 33a to be fitted onto the stator 32, and a conductor (coil) is wound around the external periphery of the bobbin 33. An arm 34 is integrally formed of resin and serves also as a rotor shaft. A cap 35 is formed of resin, and has a bearing 35a and engagement holes 35b and 35c for engagement with a case 36 which will be described later.

Incidentally, a diaphragm blade mechanism (not shown) is driven by an arm portion 34b of the arm 34 so that the diaphragm blades 17 and 18 shown in FIG. 4 are made open or closed. During this time, the angle of rotation of the rotor 31 is detected by a magnetism detecting element 37 which will be described later, and voltage to be applied to the conductor (coil) wound around the bobbin 33 is controlled so that the diaphragm blades 17 and 18 can provide a desired aperture value.

The case 36 formed of resin has a clamping portion 36e having a claw formed at its extending end for clamping the stator 32, projections 36a and 36b for positioning the cap 35 as well as the stator 32, clamping portions 36c and 36d having claws formed at their respective extending ends for clamping the cap 35, a clamping portion 36f having a claw formed at it extending end for clamping the magnetism detecting element 37, and a bearing hole (not shown) for receiving one end of a shaft portion 34a of the arm 34.

The rotor 31 is fitted onto the shaft portion 34a of the arm 34. The bobbin 33 is secured to the stator 32 by fitting the hole 33a provided in the bobbin 33 onto the linear shaped-stator arm 32c of the stator 32. The stator 32 to which the bobbin 33 is secured is held by fitting the holes 32a and 32b provided in the stator 32 onto the respective projections 36a and 36b provided on the case 36. Further, the stator 32 is fixed by the clamping portion 36e provided on the case 36.

When the projections 36a and 36b provided on the case 36 are respectively fitted into the engagement holes 35b and 35c provided in the cap 35 while maintaining the opposite ends of the shaft portion 34a of the arm 34, onto which the rotor 31 is fitted, in engagement with a bearing portion provided on the case 36 and the bearing 35a provided on the cap 35, respectively, the clamping portions 36c and 36d which are provided on the case 36 are made to engage with the cap 35, whereby the case 36 fixedly holds the cap 35.

The magnetism detecting element 37 is fixedly held by engaging with a clamping portion 36f provided on the case 36.

FIG. 6 is a diagrammatic, rear end view of the lens unit, showing in cross section only the driving part 21 of the amount-of-light adjusting device according to the first embodiment of the present invention.

As shown in FIG. 6, the center of the rotor 31 is displaced toward the optical axis from a longitudinal central line C of the two stator arms 32c and 32d of the stator 32. The rotor-opposed portion 32e (stator pole surface) of the stator 32 is also displaced toward the optical axis, correspondingly. The arm stator 32c of the stator 32 has an approximately linear shape onto which to fit the bobbin 33.

FIGS. 7(a) and 7(b) are schematic views comparatively showing the driving part of the amount-of-light adjusting device according to the first embodiment and the driving part of a conventional amount-of-light adjusting device. The driving part according to the first embodiment and the conventional driving part are respectively provided on particular lens barrels in such a manner that each of them is disposed between an internal diameter 41 and an external diameter 42 of a respective one of the particular lens barrels. In each of FIGS. 7(a) and 7(b), members for covering the driving part, such as a case and a cap, are omitted and a stator is shown in simplified form.

FIG. 7(b) shows an example in which the driving part of the conventional amount-of-light adjusting device is mounted on the lens barrel. In the example shown in FIG. 7(b), the center of a rotor 61 is approximately coincident with a longitudinal central line C' of two stator arms of a stator 62, and the driving part has a linear shape as a whole. For this reason, if the driving part is disposed within a cylindrical lens barrel (between the internal diameter 41 and the external diameter 42 of the lens barrel), the driving part will partly project from the external diameter 42 of the lens barrel as shown in FIG. 7(b). As shown, the conventional stator 62 has a rotor-opposed portion formed approximately in axial symmetry with respect to the longitudinal central line C'. As a result, a distance β between the longitudinal central line C' and the end face of the stator 62 must be made large, because if magnetic saturation is to be avoided, a minimum stator width γ is impossible to extremely reduce and because a stator arm onto which to fit a coil (bobbin) must have a linear shape so that the coil can be fitted onto the stator arm. As is apparent from the above description, the related-art example incurs an increase in the size of the amount-of-light adjusting device and hence an increase in the entire size of the lens unit.

In contrast, in the arrangement in which the driving part of the amount-of-light adjusting device according to the first embodiment is mounted on the lens barrel as shown in FIG. 7(a), the center of a rotor 51 is displaced toward the optical axis from the longitudinal central line C of two stator arms of a stator 52, and the rotor-opposed portion is also displaced toward the optical axis, correspondingly. Accordingly, the entire driving part can be formed into an approximately arcuate shape, so that the driving part can be accommodated into the lens barrel without projecting from the external diameter thereof.

Further, according to the first embodiment, since the stator 52 is disposed in axial asymmetry with respect to the longitudinal central line C, so that, within the driving part having a size smaller than the conventional driving part, it is possible to achieve both the minimum stator width γ required for avoiding magnetic saturation and the linear shape of the stator arm onto which to fit the coil linear shape.

Therefore, according to the first embodiment, it is possible to effectively achieve a reduction in the size of the amount-of-light adjusting device and a reduction in the entire size of the lens unit.

FIG. 1 is a diagrammatic, perspective view showing the lens unit on which the amount-of-light adjusting device according to the first embodiment is mounted. As shown, the driving part 21 of the amount-of-light adjusting device is mounted in compact form without projecting from the external diameter of the lens unit.

Figure 8:
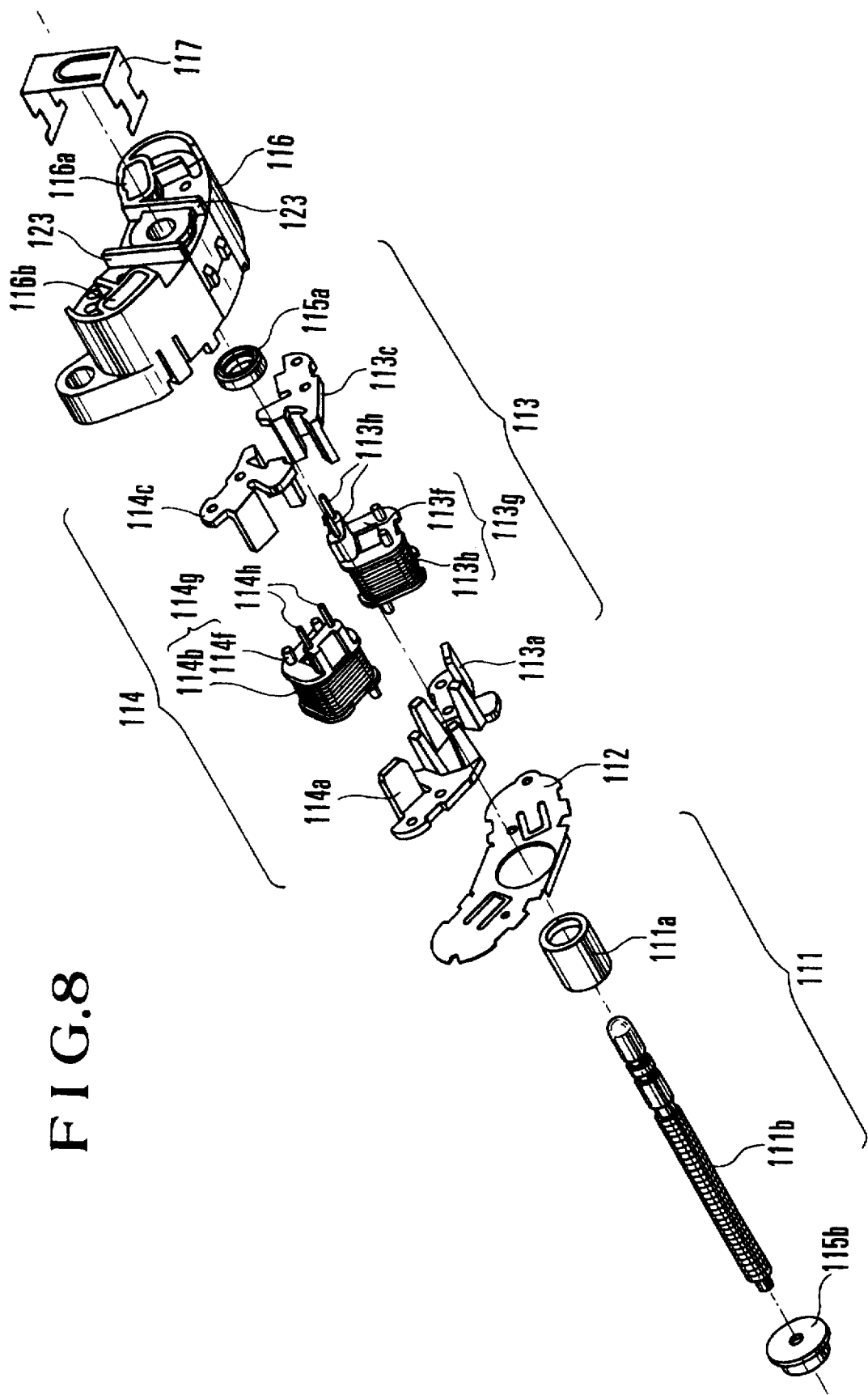
FIG. 8 is a diagrammatic, exploded view of a stepping motor for driving a lens.

FIG. 8 is a diagrammatic, exploded perspective view showing a stepping motor incorporated into the lens unit of a video camera for driving a zooming lens and a focusing lens.

The stepping motor shown in FIG. 8 includes a rotor magnet 111a which is magnetized to have a multiplicity of poles, and a lead screw 111b. The rotor magnet 111a and the lead screw 111b are fixed in a predetermined positional relationship, as by an adhesive, to constitute an output shaft 111. The shown stepping motor also includes stators 113 and 114, and the stator 113 has an upper stator 113a and a lower stator 113c, while the stator 114 has an upper stator 114a and a lower stator 114c. Each of the upper stators 113a and 114a and the lower stators 113c and 114c constitutes one phase. Coils 113b and 114b are respectively wound around bobbins 113f and 114f, and the coil 113b and the bobbin 113f constitutes a coil unit 113g, while the coil 114b and the bobbin 114f constitutes a coil unit 114g.

The shown stepping motor also includes a stator case 116 of approximately arcuate shape into which to accommodate the coil units 113g and 114g, the upper stators 113a and 114a and the lower stators 113c and 114c. Terminals 113h and 114h are fixed to the respective bobbins 113f and 114f, as by press-fitting, and the stator case 116 has openings 116a and 116b through which to insert the terminals 113h and 114h at the rear end face of the stator case 116 (on the side of the stator case 116 which is opposite to the output shaft 111).

The output shaft 111 is rotatably supported by bearings 115a and 115b. The bearing 115a is fixedly supported in the stator case 116, while the bearing 115b is fixedly supported by, for example, a lens barrel on which to mount the stepping motor.

A lid 112 for a motor body is mounted on the stator case 116. A thrust spring 117 has an urging force to urge the output shaft 111 in the axial direction thereof, and normally urges the output shaft 111 to suppress the play of the output shaft 111.

Figure 9:
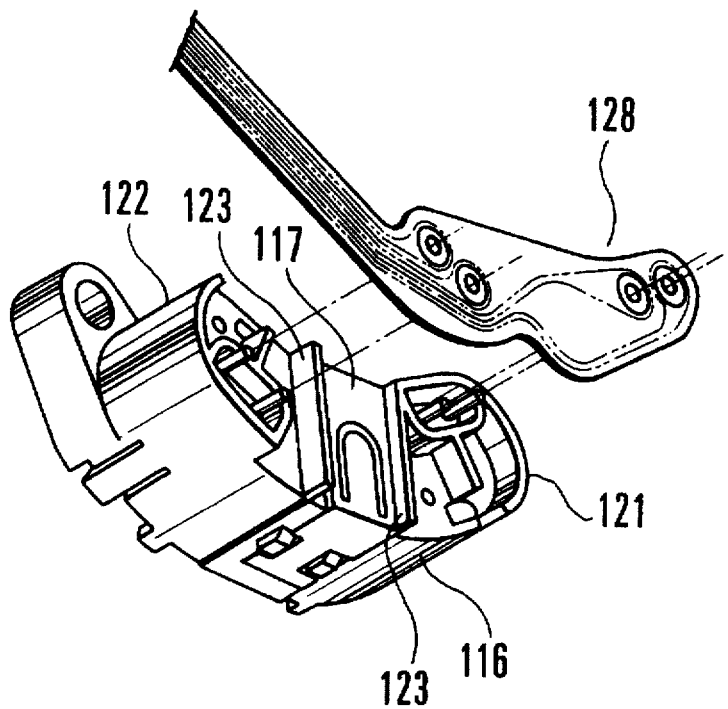
FIG. 9 is a diagrammatic, end view showing an end face of a motor.

FIG. 9 shows a state in which the coil units 113g and 114g and the thrust spring 117 as well as a flexible printed circuit board 128 for coil energization are secured to the stator case 116.

Figure 10:
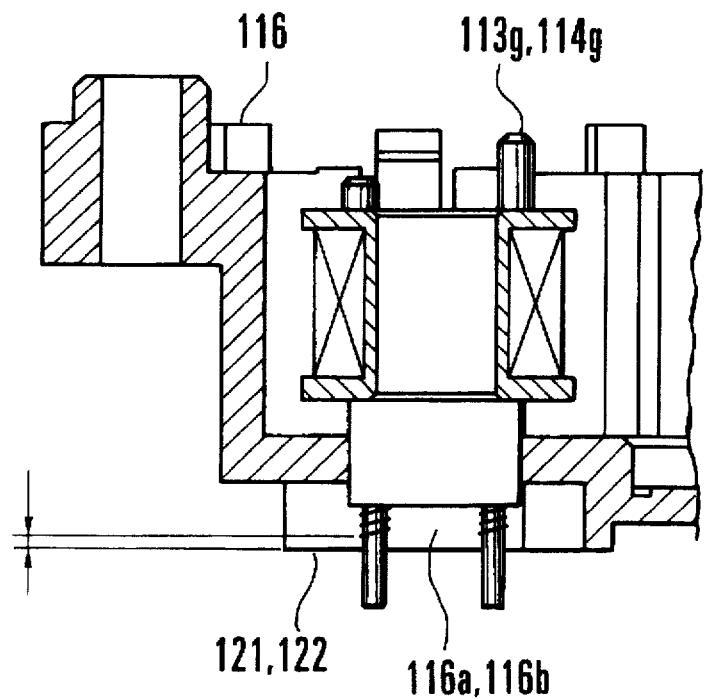
FIG. 10 is a fragmentary, cross-sectional view showing the relationship between a coil and a stator case of the motor of FIG. 8.

As shown in FIG. 9, the stator case 116 has ribs 121, 122 and 123 each having a predetermined height. As shown in FIG. 10, the heights of the respective ribs 121, 122 and 123 are selected to be greater than the heights of coils fitted onto the respective terminals 113h and 114h. Incidentally, in FIG. 10, the constituent elements other than the stator case 116, the coil units 113g and 114g are not shown for the sake of simplicity.

As shown in FIG. 9, the ribs 123 which face each other across the thrust spring 117 serve also as a guide mechanism for preventing positional deviation or the like of the thrust spring 117.

In the above-described manner, the openings 116a and 116b are provided in the rear end of the stator case 116 so that the terminals 113h of the coil unit 113g and the terminals 114h of the coil unit 114g can project through the respective openings 116a and 116b from the side of the stator case 116 which is opposite to the output shaft 111. In addition, the ribs 121 and 122 are formed which constitute part of the edges of the openings 116a and 116b, respectively. The heights of the ribs 121 and 122 are selected to be greater than the heights of the coils fitted onto the respective terminals 113h and 114h, and part of each of the ribs 121 and 122 serves as a guide mechanism for preventing positional deviation of the thrust spring 117. Accordingly, it is possible to prevent the coil terminals 113h or 114h from being impaired in mounting stability or coming off by the influence of heat while soldering is being conducted for securing the coils to the flexible printed circuit board 128. Therefore, it is possible to increase the strength of the motor body and it is also possible to reduce the entire size of the motor to a further extent. In addition, an external projection which would have conventionally been needed to mount the motor can be eliminated from the side face of a lens barrel, so that it is possible to reduce the size of the lens barrel. Further, since the ribs 121 and 122 serve as a mounting seat for the flexible printed circuit board 128, it is possible to improve the efficiency of assembling operation.

Figure 11A:
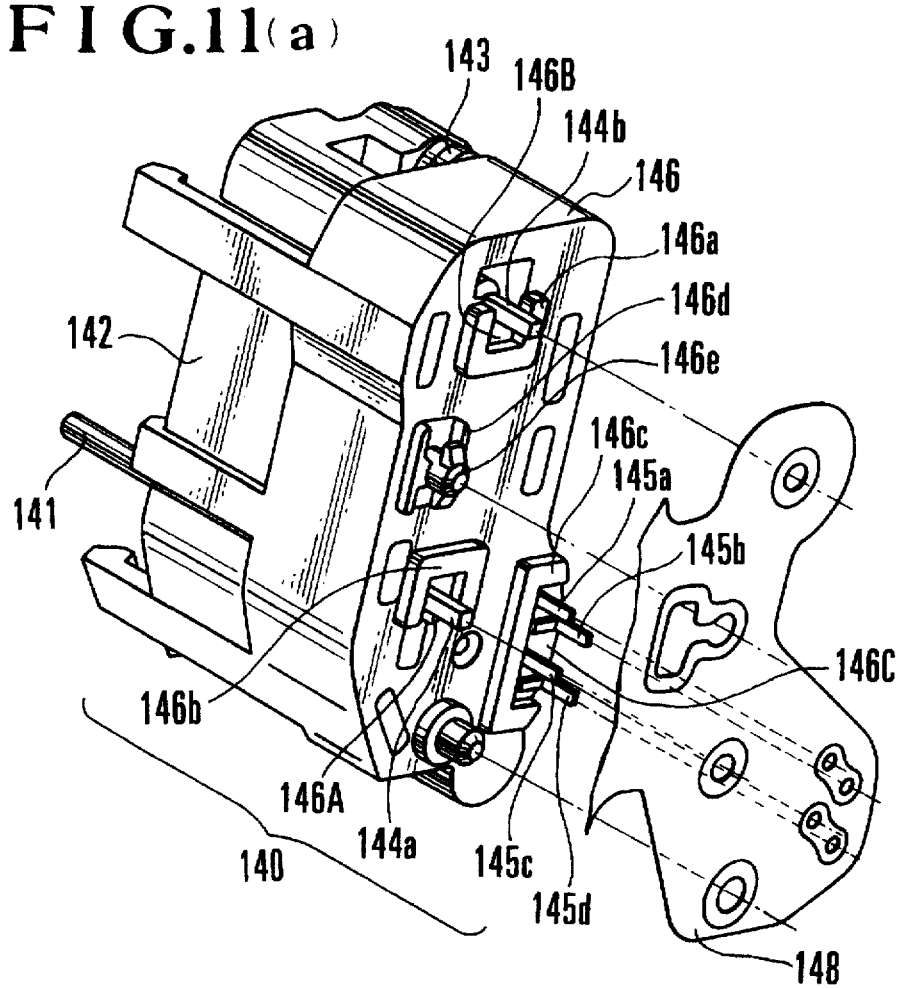
FIG. 11(a) is a diagrammatic, perspective view showing an end face of a driving part of an amount-of-light adjusting device.
Figure 11B:
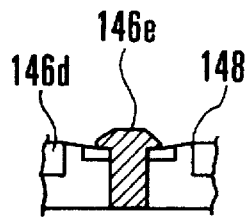
FIG. 11(b) is a fragmentary, cross-sectional view showing a state in which a flexible printed circuit board is mounted.
Figure 11C:
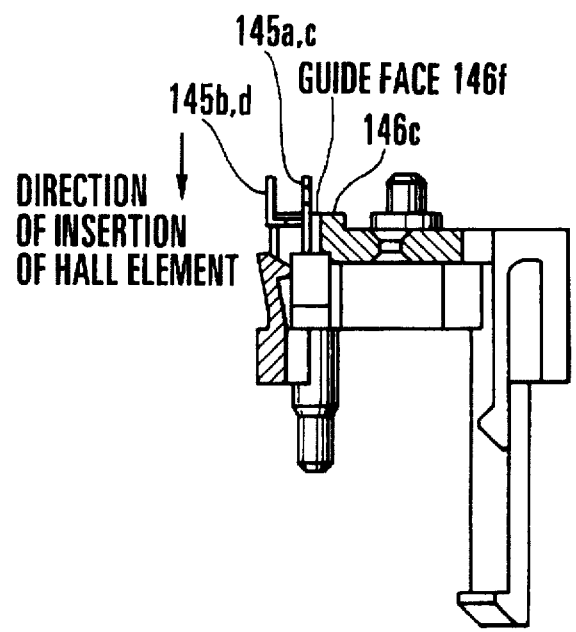
FIG. 11(c) is a diagrammatic, cross-sectional view showing ribs which serve also the function of inserting a Hall element.

FIGS. 11(a) to 11(c) show a driving unit 140 which is suitable for use as driving means for driving the amount-of-light adjusting device of a video camera or the like. The amount-of-light adjusting device is arranged to vary the area of an aperture diameter by means of, for example, two diaphragm blades so that a subject can be photographed at a correct exposure level at all times. In the driving unit 140, the magnetic poles formed in a stator 143 are opposed to a rotor magnet which is magnetized to have, for example, two poles, and a bobbin around which a coil is wound is fitted onto the stator 143. These constituent elements, such as the rotor magnet and the stator 143, are accommodated into a case 146. The case 146 is provided with a Hall element for detecting the angle of rotation of the rotor magnet by detecting the magnetic flux of the rotor magnet. In the driving unit 140, an output shaft 141 of arm-like shape which is provided at one axial end of a rotating shaft integral with the rotor magnet is fitted into an engagement hole formed in the two diaphragm blades which overlap each other. As the rotor magnet which is turnable within an angular extent of approximately 180° turns, for example, in the clockwise direction, the driving unit 140 moves the diaphragm blades in the direction in which the diaphragm blades are made to open.

Openings 146A, 146B and 146C are provided on the side of the case 146 which is opposite to the output shaft 141. The openings 146A and 146B are provided so that terminals 144a and 144b of a coil body (not shown) can respectively be inserted therethrough, while the opening 146C is provided so that terminals 145a, 145b, 145c and 145d of the Hall element body (not shown) can be inserted therethrough. Ribs 146b, 146a and 146c each having a predetermined height are respectively formed at the edges of the openings 146A, 146B and 146C.

All the ribs 146a, 146b and 146c have the same height. The height is selected to be greater than the heights of coils fitted onto the respective coil terminals 144a and 144b and also to be greater than the height of the plane in which a flexible printed circuit board 148 makes contact with a hook-like member 146e which is, as shown in FIG. 11(b), provided on the case 146 according to the first embodiment for the purpose of preventing the flexible printed circuit board 148 from coming off the case 146. Accordingly, the flexible printed circuit board 148 is prevented from easily coming off owing to a curvature thereof. The heights of the ribs 146a, 146b and 146c as well as a rib 146d are determined to satisfy the above-described conditions. As shown in FIG. 11(c), the rib 146c also has the function of a guide mechanism for allowing the Hall element for detecting the angle of rotation of the magnet to be inserted along the guide face 146f shown in FIG. 11(c) during mounting of the Hall element.

In the above-described manner, the openings 146A, 146B and 146C are provided in the rear end of the case 146 so that the terminals 144a and 144b of the coil and the terminals 145a, 145b, 145c and 145d of the Hall element can project through the respective openings 146A, 146B and 146C from the side of the case 146 which is opposite to the output shaft 141. In addition, the ribs 146a, 146b and 146c are formed at the edges of the openings 146A, 146B and 146C, respectively, and the rib 146d is formed adjacent to the hook-like member 146e. The heights of the ribs 146a, 146b, 146c and 146d are selected to be greater than the heights of the coils fitted onto the respective terminals 144a and 144b and also to be greater than the height of the plane in which the flexible printed circuit board 148 makes contact with the hook-like member 146e which is provided on the case 146 for the purpose of preventing the flexible printed circuit board 148 from coming off the case 146. Accordingly, for example, it is possible to prevent the terminals 144a, 144b, 145a, 145b, 145c and 145d from being impaired in mounting stability or coming off or the Hall element from being broken, by the influence of heat while soldering is being conducted for securing these terminals to the flexible printed circuit beard 148. Therefore, it is possible to increase the strength of the amount-of-light adjusting device and it is also possible to reduce the entire size of the amount-of-light adjusting device to a further extent. In addition, since the ribs 146a, 146b, 146c and 146d serve as a mounting seat for the flexible printed circuit beard 148, it is possible to improve the efficiency of assembling operation.

As described above, according to the first embodiment, it is possible to dispose the coil terminals protected by the ribs not on the side face of accommodating means, such as an exterior case, but, for example, at the rear end face thereof. Accordingly, an external projection which would have conventionally been needed to mount the drive unit can be eliminated from the side face of, for example, a lens barrel, and it is possible to use, for example, a stepping motor for the purpose of lens driving.

Not only are such ribs used to protect the terminals, but can also be used as means for positioning and guiding urging means which abuts against one end face of the rotating shaft of the rotor and urges the rotating shaft of the rotor in the direction of the other end.

As another construction of the drive unit, it is possible to use a motor other than the aforesaid stepping motor. In this case as well, it is possible to dispose not only terminals through which to apply voltage to the coil of the motor, but also, for example, the terminals of the Hall element at the rear end face of the motor. Accordingly, the motor can be employed as driving means for the amount-of-light adjusting device of a video camera or the like.

Since the coil terminals are disposed to project from the bobbin around which the coil is wound and the heights of the respective ribs are selected to be greater than the heights of the coils fitted onto the terminals, it is possible to prevent the terminals from being impaired in mounting stability or coming off by the influence of heat while soldering is being conducted for securing these terminals to a flexible printed circuit beard or the like. Therefore, it is possible to produce a drive unit having an improved reliability. In addition, it is possible to increase the strength of the drive unit itself. Further, since the ribs serve as a mounting seat for the flexible printed circuit board, it is possible to improve the efficiency of assembling operation.

An engagement member for engaging with and holding the flexible printed circuit board which is disposed at one external end face of the accommodating means is supported on the one external end face, and a rib is formed to have a height greater than the engagement plane of the engagement member. Accordingly, it is possible to securely hold the flexible printed circuit board.

Further, if the above-described drive unit is utilized as an amount-of-light adjusting device, the ribs can also serve as a guide member for guiding the Hall element to a mounting position on the accommodating means.

Figure 12A:
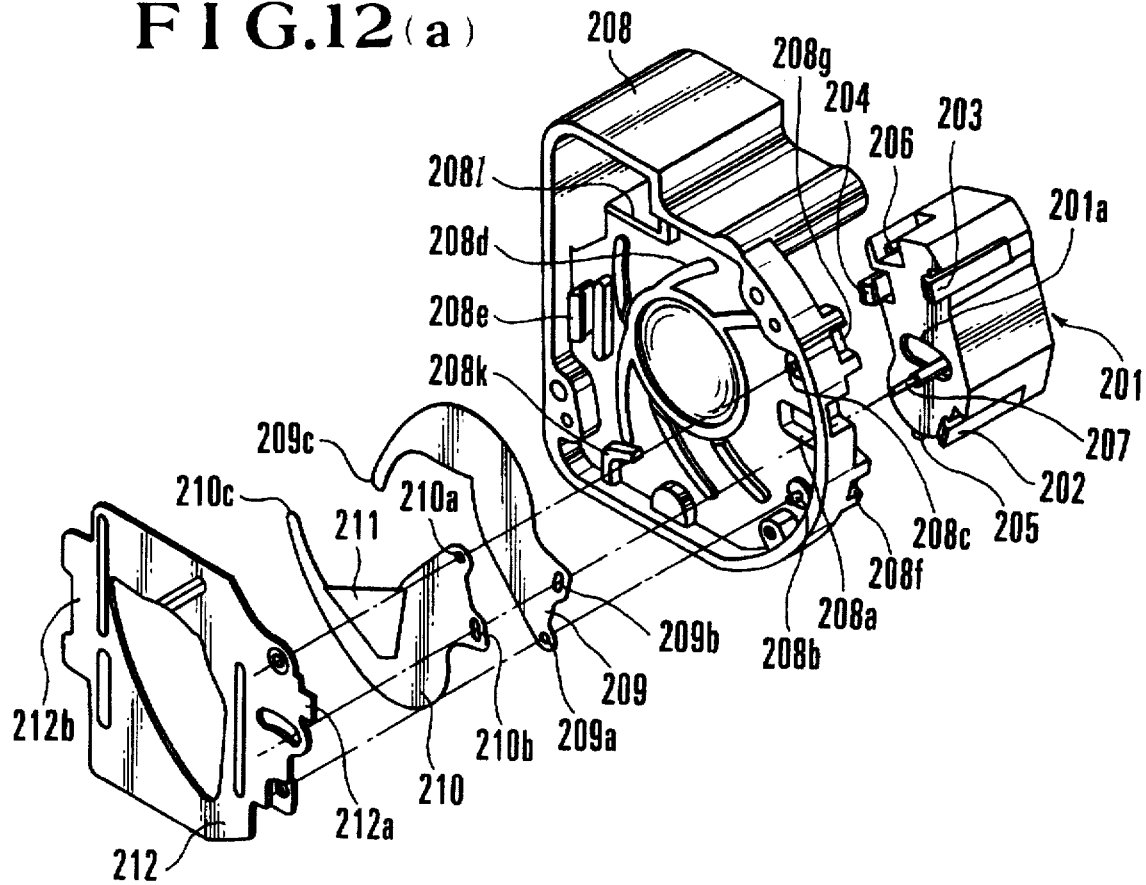
FIG. 12(a) is a diagrammatic, exploded perspective view showing an amount-of-light adjusting device according to a first embodiment of the present invention.
Figure 12B:
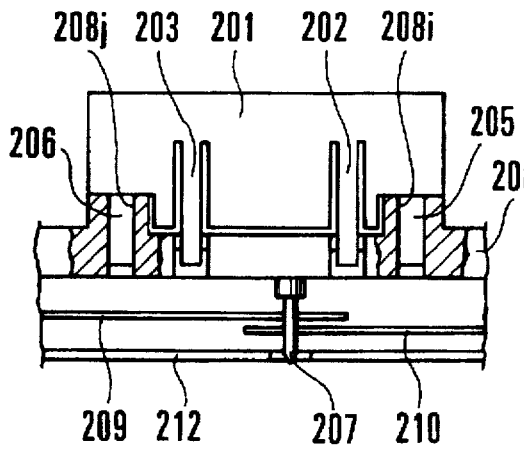
FIG. 12(b) is a fragmentary, cross-sectional view showing an assembled state of the amount-of-light adjusting device according to the first embodiment of the present invention.
Figure 12C:
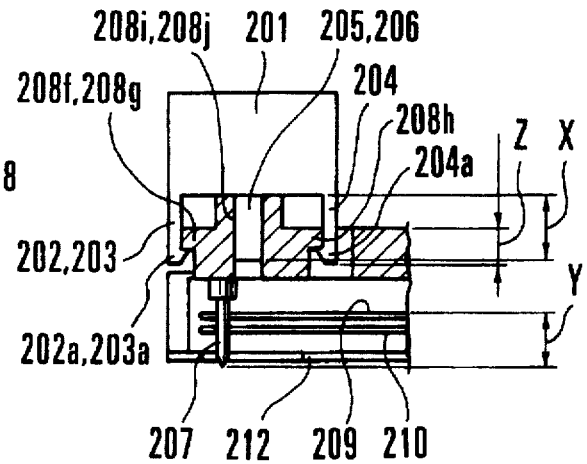
FIG. 12(c) is a fragmentary, cross-sectional view showing an assembled state of the amount-of-light adjusting device according to the first embodiment of the present invention.

FIG. 12(a) is a diagrammatic exploded view of an amount-of-light adjusting device, FIG. 12(b) is a fragmentary view showing the assembled state of the amount-of-light adjusting device, and FIG. 12(c) is a fragmentary view showing the dimensional requirements of the amount-of-light adjusting device.

Referring to FIG. 12(a), the shown amount-of-light adjusting device includes a driving part 201 having first, second and third mounting hooks 202, 203 and 204. The first, second and third mounting hooks 202, 203 and 204 have engagement claws 202a, 203a and 204a at their respective extending ends, and the engagement claws 202a, 203a and 204a have inclined surfaces at their respective engagement ends. The driving part 201 also has first and second positioning pins 205 and 206 fitted into a lens barrel 208 for positioning the driving part 201 with respect to the lens barrel 208, and an output pin 207 for driving first and second diaphragm blades 209 and 210 which will be described later. The amount-of-light adjusting device also includes the lens barrel 208, the first diaphragm blade 209, the second diaphragm blade 210, an ND filter 211 and a blade pressure plate 212.

The driving part 201 is prepared as a unit, and has an opening 201a which serves also as a stopper for limiting the turning range of a rotor within an area wider than that determined by the optical conditions of a lens. The output pin 207 extends through the opening 201a so that the driving power produced in the driving part 201 can be outputted to the outside.

The driving part 201 is provided with urging means for urging the output pin 207 in a predetermined rotational direction, so that, during a de-energized state, the output pin 207 abuts against one end face of the opening 201a located in a predetermined direction.

As shown in FIG. 12(b), the first and second positioning pins 205 and 206 are fitted into first and second positioning holes 208i and 208j provided in the lens barrel 208, in the direction of the optical axis of the lens barrel 208, so that the driving part 201 can be positioned with respect to the lens barrel 208 in a plane perpendicular to the optical axis of the lens barrel 208. The first, second and third mounting hooks 202, 203 and 204 of the driving part 201 are respectively brought into engagement with first, second and third mounting portions 208f, 208g and 208h provided on the lens barrel 208, so that the driving part 201 is fixed to the lens barrel 208. If an urging member or urging means for urging the driving part 201 and lens barrel 208 in the direction in which they are forced away from each other is provided between the driving part 201 and the lens barrel 208, it is possible to eliminate the influence of a clearance occurring between the driving part 201 and the lens barrel 208 in the direction of the optical axis.

The lens barrel 208 has an opening 208a which serves also as a stopper for limiting the turning range of the output pin 207 of the driving part 201 within the area required to achieve predetermined optical performance. When the driving part 201 is mounted on the lens barrel 208, the output pin 207 is brought into abutment with one end face of the opening 208a of the lens barrel 208 in the predetermined direction owing to the fact that the stopper range of the opening 208a provided in the lens barrel 208 is narrower than the opening 201a provided in the driving part 201.

One end face of the lens barrel 208 is provided with first and second diaphragm blade pivot shafts 208b and 208c, a rail 208d, first and second diaphragm blade stoppers 208k and 208l and a blade pressure plate fixing hook 208e. The first diaphragm blade pivot shaft 208b is fitted into a fitting hole 209a formed in the first diaphragm blade 209 and rotatably supports the first diaphragm blade 209. The second diaphragm blade pivot shaft 208c is fitted into a fitting hole 210a formed in the second diaphragm blade 210 and rotatably supports the second diaphragm blade 210.

The rail 208d is formed by a face with which the first and second diaphragm blades 209 and 210 are brought into slidable contact, and limits the respective positions of the first and second diaphragm blades 209 and 210 with respect to the direction of the optical axis.

The first diaphragm blade 209 is formed, as by pressing polyester film, and has the fitting hole (or pivotal hole) 209a which serves as the center of rotation of the first diaphragm blade 209, and a slot 209b which is fitted onto the output pin 207 of the driving part 201 to rotate the first diaphragm blade 209 in accordance with the turning of the output pin 207 so that the first diaphragm blade 209 can be moved in a diaphragm opening or closing direction.

The second diaphragm blade 210 is similarly formed, as by pressing polyester film, and has the fitting hole (or pivotal hole) 210a which serves as the center of rotation of the second diaphragm blade 210, and a slot 210b which is fitted onto the output pin 207 of the driving part 201 to rotate the second diaphragm blade 210 in accordance with the turning of the output pin 207 so that the second diaphragm blade 210 can be moved in the diaphragm opening or closing direction.

The blade pressure plate 212 is fixed to the lens barrel 208 in such a manner that a predetermined clearance is held between the blade pressure plate 212 and the lens barrel 208. The blade pressure plate 212 limits the respective positions of the first and second diaphragm blades 209 and 210 with respect to the direction of the optical axis.

The lens barrel 208 has the first and second diaphragm blade stoppers 208k and 208l. After the first and second diaphragm blades 209 and 210 and the blade pressure plate 212 have been mounted on the lens barrel 208, when the lens barrel 208 is made to rotate counterclockwise by 90° from the state shown in FIG. 12(a) until the position of the lens barrel 208 at which to mount the driving part 201 faces up, the first diaphragm blade 209 rotates about the pivotal hole 209a by its own weight. When an extending end 209c of the first diaphragm blade 209 comes into abutment with the first diaphragm blade stopper 208k of the lens barrel 208, the first diaphragm blade 209 is positioned at that location. Similarly, the second diaphragm blade 210 rotates about the slot 210b by its own weight, and is positioned at a location where an extending end 210c of the second diaphragm blade 210 abuts against the second diaphragm blade stopper 208l of the lens barrel 208. The state in which the extending ends 209c and 210c of the first and second diaphragm blades 209 and 210 respectively abut against the first and second diaphragm blade stoppers 208k and 208l corresponds to the minimum aperture size or fully closed aperture position of the amount-of-light adjusting device.

The assembled state and the assembling process of the driving part 201 will be described below with reference to FIGS. 12(b) and 12(c).

FIGS. 12(b) and 12(c) are fragmentary views showing the state in which the driving part 201, the first and second diaphragm blades 209 and 210 and the blade pressure plate 212 are mounted on the lens barrel 208.

The first positioning pin 205 of the driving part 201 is fitted into a first positioning hole 208i of the lens barrel 208, while the second positioning pin 206 of the driving part 201 is fitted into a second positioning hole 208j of the lens barrel 208, whereby the driving part 201 is positioned with respect to the direction perpendicular to the optical axis of the lens barrel 208. The first, second and third mounting hooks 202, 203 and 204 of the driving part 201 each of which has elasticity are respectively engaged with the first, second and third mounting portions 208f, 208g and 208h of the lens barrel 208 as described previously, so that the driving part 201 is fixed to the lens barrel 208.

The output pin 207 of the driving part 201 is fitted into the slots 209b and 210b of the first and second diaphragm blades 209 and 210. The shapes of the driving part 201 and the lens barrel 208 are selected to satisfy X>Y>Z, wherein X represents the length by which each of the first and second positioning pins 205 and 206 of the driving part 201 is fitted into a respective one of the first and second positioning holes 208i and 208j of the lens barrel 208; Y represents the margin length of the output pin 207 which indicates the distance between the tip of the output pin 207 of the driving part 201 and the face of the first diaphragm blade 209 which is opposed to the driving part 201; and Z represents a hooking length which is the length between the position at which the inclined surfaces provided at the respective engagement ends of the engagement claws 202a, 203a and 204a of the first, second and third mounting hooks 202, 203 and 204 of the driving part 201 make contact with the first, second and third mounting portions 208f, 208g and 208h of the lens barrel 208 and a normal mounting position at which the driving part 201 is mounted on the lens barrel 208 in a completely hooked state. The hooking length Z is needed to bring the inclined surfaces of the engagement claws 202a, 203a and 204a into abutment with the wall surface of the lens barrel 208, fit the engagement claws 202a, 203a and 204a onto the first, second and third mounting portions 208f, 208g and 208h by elastic deformation of the respective inclined surfaces, and hook the respective engagement claws 202a, 203a and 204a on the first, second and third mounting portions 208f, 208g and 208h.

The assembly of the amount-of-light adjusting device according to the first embodiment is performed in the following manner by utilizing the above-described dimensional relationship. As described previously, after the first and second diaphragm blades 209 and 210 and the blade pressure plate 212 have been mounted on the lens barrel 208, when the lens barrel 208 is made to rotate counterclockwise by 90° from the state shown in FIG. 12(a), the first and second diaphragm blades 209 and 210 rotate about the pivotal hole up to the fully closed aperture position by their own weights. If the process of mounting the driving part 201 on the lens barrel 208 in the direction of the optical axis is started in that state, the first and second positioning pins 205 and 206 of the driving part 201 are respectively fitted into the first and second positioning holes 208i and 208j of the lens barrel 208. Simultaneously, the output pin 207 which has been urged into abutment with one end of the opening 201a which serves also as the stopper of the driving part 201, by the urging means incorporated in the driving part 201, is urged against the urging force of the urging means, such as detent torque, into abutment with one end of the opening 208a which serves also as the stopper of the lens barrel 208. Thus, the tip of the output pin 207 is made to coincide with the overlapping slots 209b and 210b of the first and second diaphragm blades 209 and 210 in the direction of the optical axis. When the driving part 201 is forced forward in this state, the tip of the output pin 207 is inserted into the slots 209b and 210b.

Then, the inclined surfaces provided at the respective engagement ends of the engagement claws 202a, 203a and 204a of the first, second and third mounting hooks 202, 203 and 204 of the driving part 201 come into contact with the first, second and third mounting portions 208f, 208g and 208h of the lens barrel 208, respectively. When the engagement claws 202a, 203a and 204a are hooked on the first, second and third mounting hooks 202, 203 and 204, the first, second and third mounting hooks 202, 203 and 204 respectively engage with the first, second and third mounting portions 208f, 208g and 208h of the lens barrel 208, whereby the driving part 201 and the lens barrel 208 are fixed to each other. In this case, the opening 208a of the lens barrel 208, which serves as a stopper for determining the position of the output pin 207 which corresponds to the fully closed aperture position of the first and second diaphragm blades 209 and 210, serves also as a stopper located in close proximity to the first and second diaphragm blades 209 and 210. Accordingly, even if the mounting position of the driving part 201 is separate from the first and second diaphragm blades 209 and 210 in the direction of the optical axis, the output pin 207 can be securely fitted into the slots 209b and 210b of the first and second diaphragm blades 209 and 210, thereby determining a predetermined fully closed aperture position or minimum aperture size position.

Then, after the first and second positioning pins 205 and 206 and the lens barrel 208 have engaged with each other, the output pin 207 and the first and second diaphragm blades 209 and 210 engage with each other, whereby the first, second and third mounting hooks 202, 203 and 204 are forced for hooking purpose. Accordingly, even if the clearance between the first or second positioning pins 205 or 206 and the first or second positioning holes 208i or 208j is comparatively large and the relative position between the driving part 201 and the lens barrel 208 tends to be easily varied by a force which is applied to the first, second and third mounting hooks 202, 203 and 204 for hooking purpose, it is possible to conduct a secure assembling operation without a risk that the first or second diaphragm blade 209 or 210 may be damaged by the output pin 207.

If the relative position between the driving part 201 and the lens barrel 208 can be securely determined, as by reducing the clearances between the first positioning pin 205 and 206 and the first positioning hole 208i and between the second positioning pin 206 and the second positioning hole 208j, the aforesaid dimensional relationship may be selected to be X>Z>Y.

The shape of the tip of the output pin of the amount-of-light adjusting device according to the first embodiment as well as a method of manufacturing such output pin will be described below with reference to FIG. 13.

Figure 13:
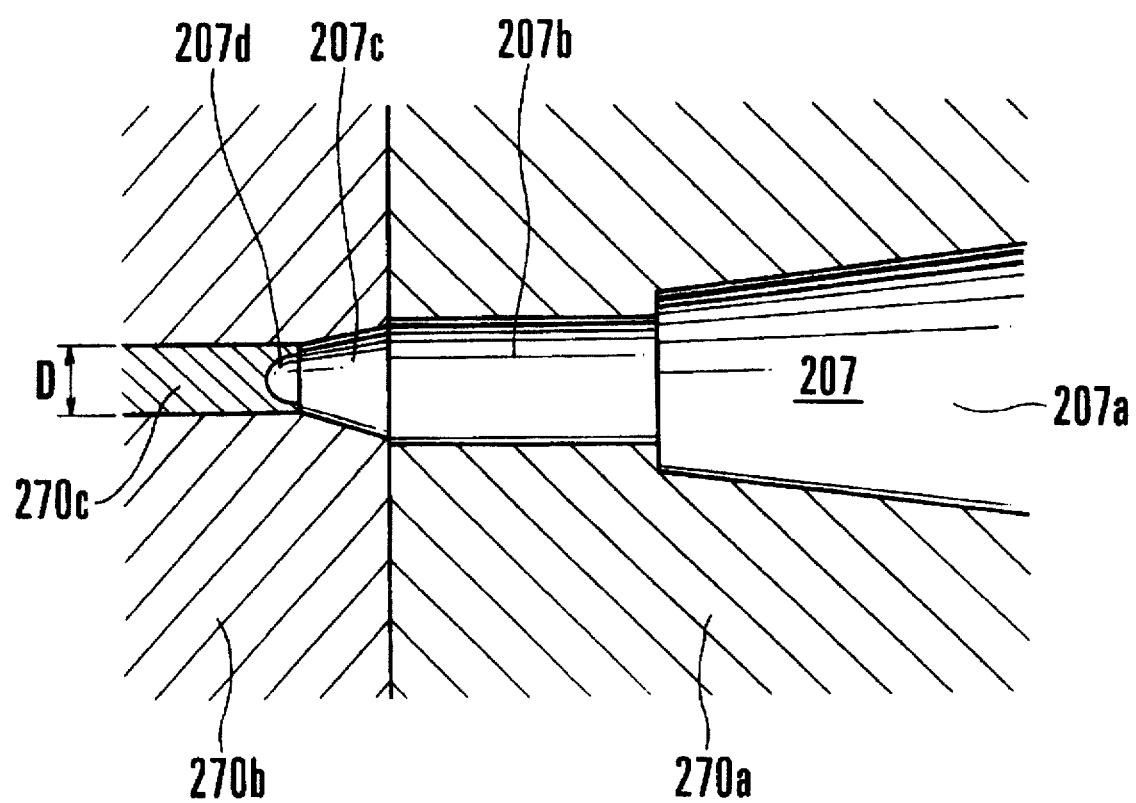
FIG. 13 is a view showing the shape of the tip of the output pin 207 shown in FIG. 12(a) and a forming method therefor.

Referring to FIG. 13, the output pin 207 includes a first tapered portion 207a, a fitting portion 207b of straight shape, a second tapered portion 207c and a spherical tip portion 207d.

The respective shapes of the first tapered portion 207a and the fitting portion 207b which is fitted into the slots 209b and 210b of the first and second diaphragm blades 209 and 210 are determined by a first mold element 270a, the shape of the second tapered portion 207c is determined by a second mold element 270b, and the shape of the spherical tip portion 207d is determined by an ejector pin 270c. The first mold element 270a and the second mold element 270b are fixed to each other, and the ejector pin 270c is movable with respect to the first and second mold elements 270a and 270b and serves the role of ejecting the output pin 207 from the mold after the completion of formation of the output pin 207.

The shape of the tip of the ejector pin 270c is selected so that the tip of the output pin 207 can be formed into a spherical shape which is smoothly joined to the second tapered portion 207c.

A diameter D of the ejector pin 270c is set to a diameter size which can be accommodated into an opening formed by the overlapping of the slots 209b and 210b of the first and second diaphragm blades 209 and 210, even if the relative position between such opening and the output pin 207 does not strictly coincide with each other. The diameter D is determined while allowing for factors such as the variations of the position of the tip of the output pin 207 and the variations of the position of the opening both of which result from the variations of the dimensions of the respective portions and the setting of the aforesaid clearances when the first and second diaphragm blades 209 and 210 are positioned at their predetermined locations by their own weights in the above-described assembling procedure.

Figure 14:
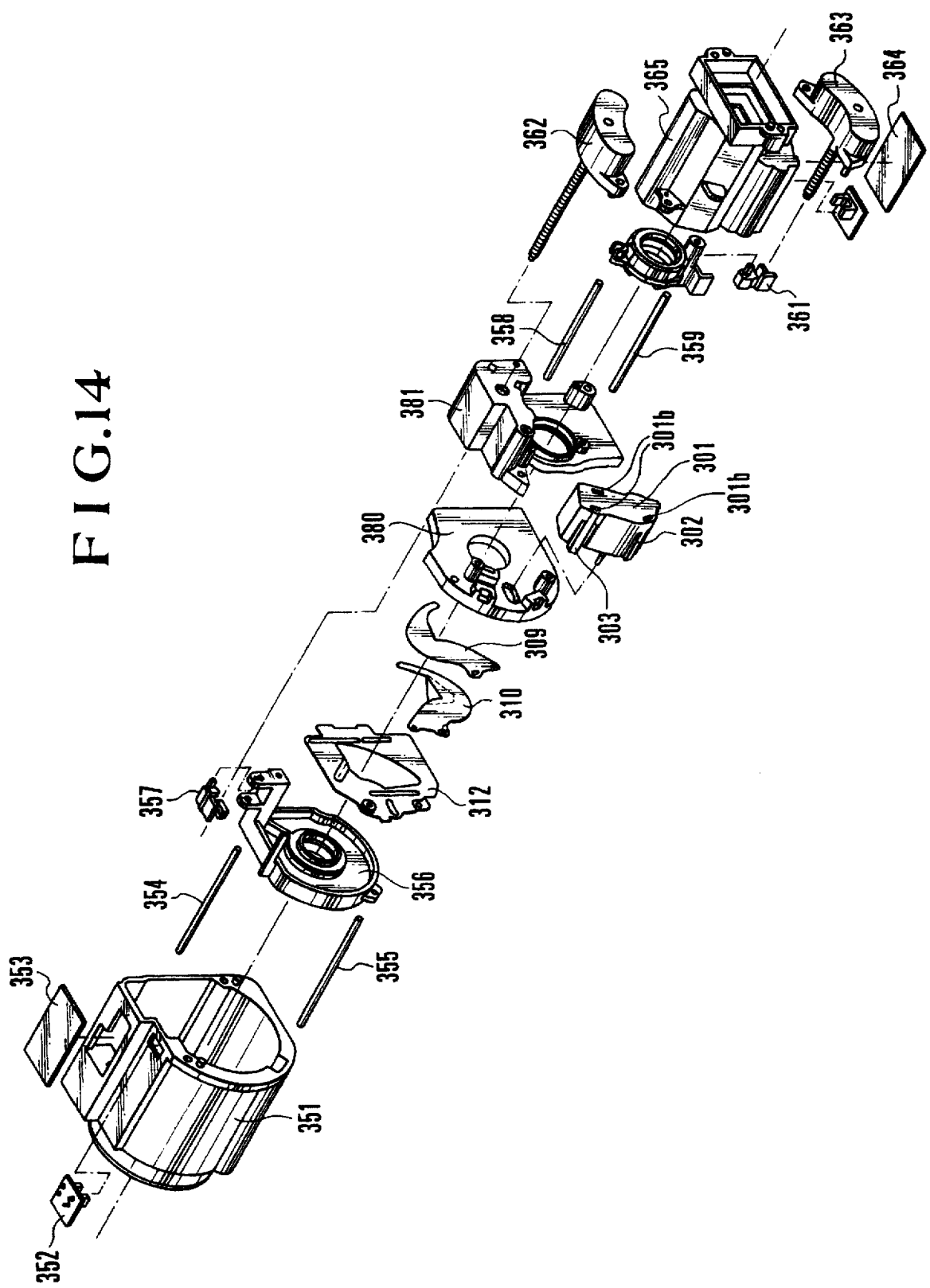
FIG. 14 is a diagrammatic, exploded perspective view of a lens unit according to a second embodiment of the present invention.

Although in the above-described first embodiment of the present invention the driving part and the diaphragm blades are directly fixed to the lens barrel, the amount-of-light adjusting device may also be independently provided. FIG. 14 is a diagrammatic exploded view of a second embodiment of the present invention, showing an amount-of-light adjusting device which is constructed as an independent unit. In FIG. 14, reference numeral 380 denotes a base plate, and reference numeral 381 denotes a lens barrel. A driving part 301 is fixed to the base plate 380, and diaphragm blades 309 and 310 are rotatably supported by a shaft (not shown) provided on the base plate 380, i.e., the constituent elements of the amount-of-light adjusting device which are provided on the third lens holding member 3 shown in FIG. 3 are provided on the base plate 380.

This construction makes it possible to independently inspect the amount-of-light adjusting device alone, so that it is possible to improve maintainability in the manufacturing process.

As is apparent from the above description, according to the first and second embodiments, when a plurality of diaphragm members (blades) are set to a mounting member and, for example, the mounting member is made to rotate by a predetermined angle about the optical axis, the plurality of diaphragm members naturally turn up to their respective particular positions which correspond to, for example, a diaphragm closed position, whereby the plurality of diaphragm members can be connected to a driving force transmitting member. A driving member has a driving shaft integral with a rotor magnet magnetized to have two poles, and detent torque is produced during a de-energized state on the basis of the relationship between the two poles and the opposed poles formed in a yoke. The driving force transmitting member secured to the driving shaft is urged, by the detent torque, toward a position where the driving force transmitting member drives the diaphragm members, for example, in the diaphragm closing direction. Therefore, when the driving member is forced into the mounting member by positioning means, the driving force transmitting member is naturally connected to the plurality of diaphragm members. Accordingly, it is possible to improve the maintainability of video cameras or the like.

The driving member has first limiting means for limiting a first turning range of the driving force transmitting member containing an arm member, and the mounting member has second limiting means for limiting a second turning range of the driving force transmitting member. Since the second turning range is selected to be equal to or less than the first turning range, the driving force transmitting member can be smoothly connected to the plurality of diaphragm members.

It is to be noted that if the mounting member is prepared as a lens holding member which constitutes a lens barrel, it can be effectively incorporated into a lens unit such as a zoom lens for a video camera.

Further, the fitting length, measured in the direction of the optical axis, of the positioning means for positioning the driving member with respect to the mounting member is selected to be greater than the fitting margin length, measured in the direction of the optical axis, which is required to connect the driving force transmitting member to the diaphragm members. Accordingly, it is possible to assure secure connection between the driving force transmitting member and the diaphragm members. In particular, the driving force transmitting member including the arm member and a pin member which extends from one end of the arm member along the optical axis is integrally formed by plastics molding so that the tip of the pin member can be given a smooth, spherical shape. Accordingly, it is possible to assure a far smoother connection between the driving force transmitting member and the diaphragm members.

Further, the driving member and the plurality of diaphragm members are respectively disposed on the opposite sides of the mounting member, and engagement means is adopted for fixing the driving member and the diaphragm members to each other by pressing the driving member into engagement with the mounting member. Accordingly, it is possible to facilitate the mounting of the driving member. Since the engagement by the engagement means can be released on the side on which the driving member is mounted, it is possible to easily remove the driving member from the lens barrel or the like.

Further, the second limiting means provided on the mounting member for limiting the second turning range of the driving force transmitting member is provided in close proximity to the plurality of diaphragm members. Accordingly, it is possible to improve the precision of a fully open aperture dieter or minimum aperture diameter.

A third embodiment of the amount-of-light adjusting device which is improved according to the present invention will be described below.

Referring to FIGS. 19 through 22, a rotor 401 which constitutes part of an electromagnetic actuator has a rotor body 401a made from a cylinder formed of, for example, a neodymium-iron-boron based ferromagnetic alloy, and the rotor body 401a is magnetized to have an N-pole area and an S-pole area separated from each other along a radial line passing through the axis of the rotor body 401a. Accordingly, the circumferential length of the external periphery of the rotor 401 is divided into equal halves which correspond to the N-pole area and the S-pole area ½, respectively. Shafts 401b and 401c project from the opposite end faces of the rotor body 401a, and the shaft 401b is supported by an axial hole of an actuator end plate 405 which will be described later, while the shaft 401c is supported by an axial hole of an amount-of-light adjusting device base plate 407 which will be described later.

A stator 402 which constitutes part of the electromagnetic actuator includes a pair of yokes 402a and 402b each made from a laminated silicon steel sheet, a bobbin 404 made of plastics and fitted onto the yoke 402b, and a coil 403 wound around the bobbin 404.

Figure 15:
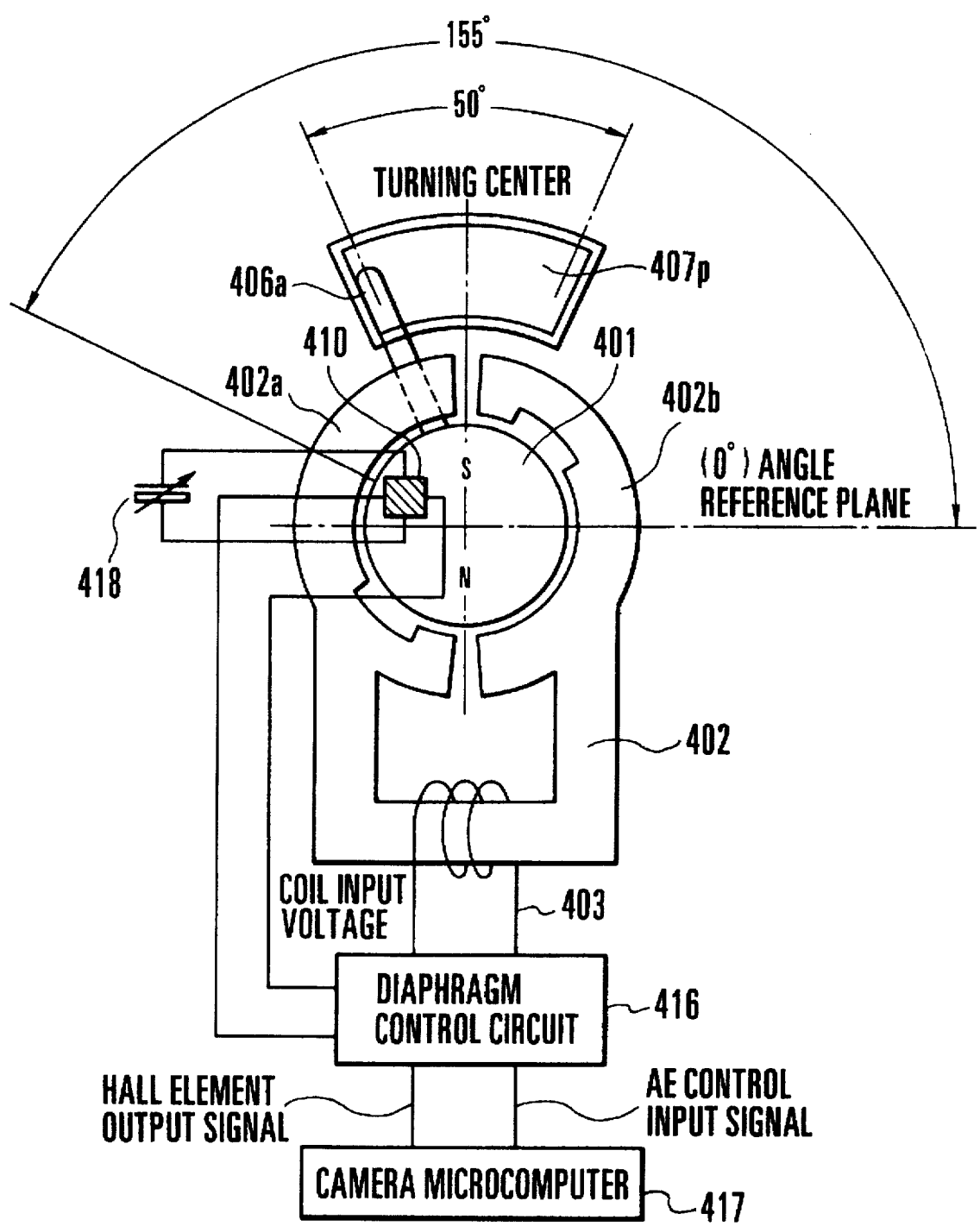
FIG. 15 is a schematic view of an electromagnetic actuator portion of an amount-of-light adjusting device according to the present invention, showing a state in which a coil is not energized.

As shown in FIG. 15, each of the yokes 402a and 402b has a semi-cylindrical shape at one end thereof so that yokes 402a and 402b can surround the external periphery of the rotor body 401a, and the external periphery of the semi-cylindrical, rotor body 401a is surrounded by the semi-cylindrical portions of the respective yokes 402a and 402b. The dimension of each of the yokes 402a and 402b in the thickness direction thereof (in a direction parallel to the axis of the rotor body 401a) is selected to be smaller than the axial dimension of the rotor body 401a. Accordingly, the electromagnetic actuator is designed so that one end portion (in FIG. 19, upper end portion) of the rotor body 401a can project upward (toward the actuator end plate 405) from the yokes 402a and 402b when the electromagnetic actuator is assembled. A disk 406 is fixed to the other end face (the lower end face, as viewed in FIG. 19) of the rotor body 401a, and the disk 406 has an arm 406a which projects from its peripheral edge in the axial direction. The disk 406 is disposed on the lower side of the yokes 402a and 402b (on the side on which the base plate 407 is located), and the arm 406a extends through a window 407p formed in the base plate 407 and is inserted into slots formed in diaphragm blades 408a and 408b which will be described later.

Coil connecting terminals 404a and 404b to which the opposite ends of the coil 403 are respectively connected project from the upper side of the bobbin 404 around which the coil 403 is wound. The coil connecting terminals 404a and 404b respectively extend through holes 405b and 405c formed in the actuator end plate 405 which will be described later, and are respectively inserted into holes 411c and 411d formed in a flexible printed circuit beard 411 outside of the actuator end plate 405. The coil connecting terminals 404a and 404b are connected to the wiring of the flexible printed circuit board 411 (hereinafter referred to simply as the circuit board 411) by soldering at lands which surround the respective holes 411c and 411d.

The rotor body 401a of the rotor 401 is inserted into the hole formed by the semi-cylindrical portions of the respective yokes 402a and 402b of the stator 402, with a small gap being maintained between the rotor body 401a and the inside faces of the semi-cylindrical portions. The stator 402 is mounted on one face of the amount-of-light adjusting device base plate 407 by a mounting structure which will be described later, and the actuator end plate 405 is fixed to the base plate 407 by a mounting structure which will be described later, thereby pressing the stator 402 against the base plate 407 and covering both the rotor 401 and the stator 402.

A Hall element 410 for detecting the rotational position of the rotor body 401a is bonded to the circuit board 411. The Hall element 410 is fitted into a window 405f formed in the actuator end plate 405, and is opposed to the end face of the rotor body 401a.

An end plate or cover 409 is opposed to the other face of the amount-of-light adjusting device base plate 407. The cover 409 is fixed to the base plate 407 by three projections 409a to 409c formed at the peripheral edge of the cover 409. Diaphragm blades 408a and 408b are disposed in the space formed between the cover 409 and the base plate 407. The diaphragm blades 408a and 408b are pivotally fitted onto a pin, which projects from the opposed face of the base plate 407, so that the diaphragm blades 408a and 408b can be made to turn about pin holes 408a-2 and 408b-2, respectively. Slots 408a-1 and 408b-1 are formed in the respective diaphragm blades 408a and 408b, and the arm 406a of the disk 406 fixed to the rotor body 401a is inserted into the slots 408a-1 and 408b-1.

The detailed structures of the aforementioned respective structure members will be further described below.

Figure 19:
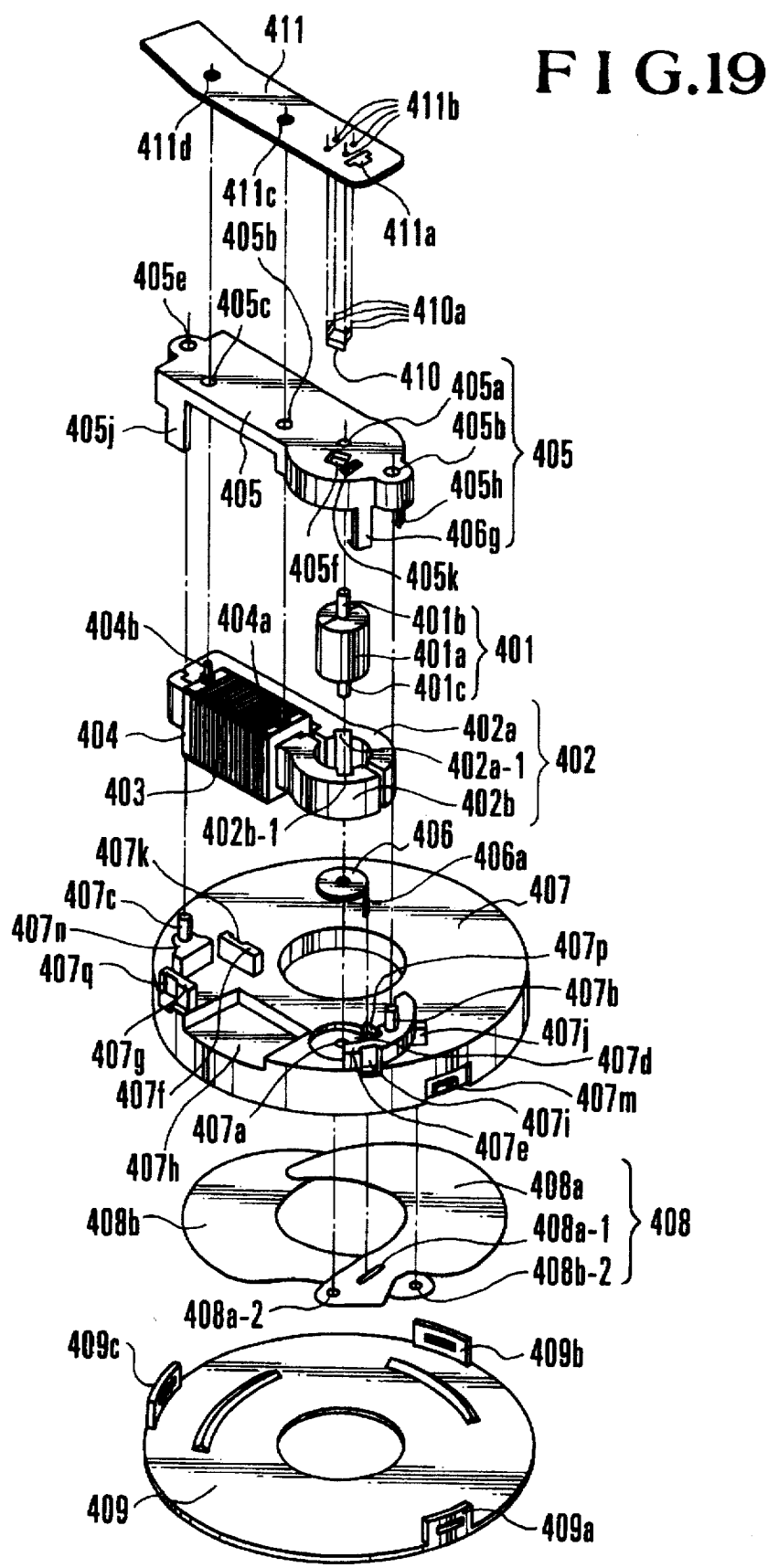
FIG. 19 is a diagrammatic, exploded perspective view of an amount-of-light adjusting device according to a third embodiment of the present invention.
Figure 20:
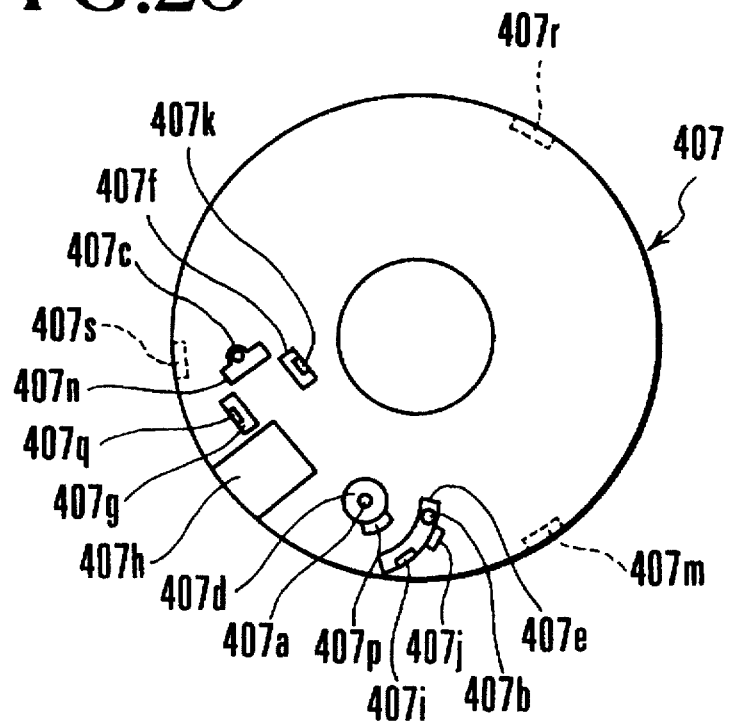
FIG. 20 is a schematic, plan view showing one end face of a base plate 407 of the amount-of-light adjusting device.

As shown in FIG. 19, four projections 407n, 407g, 407f and 407e which project to fit onto the peripheral face of the stator 402 are provided on the stator-side face of the base plate 407. The projections 407n, 407g, 407f and 407e serve as both positioning members for positioning the base plate 407 of the stator 402 and fixing members for fixing the stator 402, and are disposed along the external contour of the stator 402. Pins 407c and 407b project from the tops of the respective projections 407n and 407e. The pin 407c is inserted into a pin hole 405e formed in the actuator end plate 405, while the pin 407b is inserted into a pin hole 405d formed in the actuator end plate 405.

Grooves 407k, 407q and 407i are respectively formed in the outside wall faces of the projections 407f, 407g and 407e. A leg or projection (not shown) of the actuator end plate 405 is brought into engagement with the groove 407k, a leg 405j of the actuator end plate 405 is brought into engagement with the groove 407q, and a leg 405g of the actuator end plate 405 is brought into engagement with the groove 407i. A groove 407j is formed at a location outside of the projection 407e of the base plate 407, and a leg 405h of the actuator end plate 405 is inserted into the groove 407j.

In other words, the three grooves 407k, 407q and 407i formed in the outside wall faces of the respective projections 407f, 407g and 407e and the groove 407j formed in the face of the base plate 407 constitute the mounting structure for fixing the actuator end plate 405 to the base plate 407 by engagement.

Figure 21:
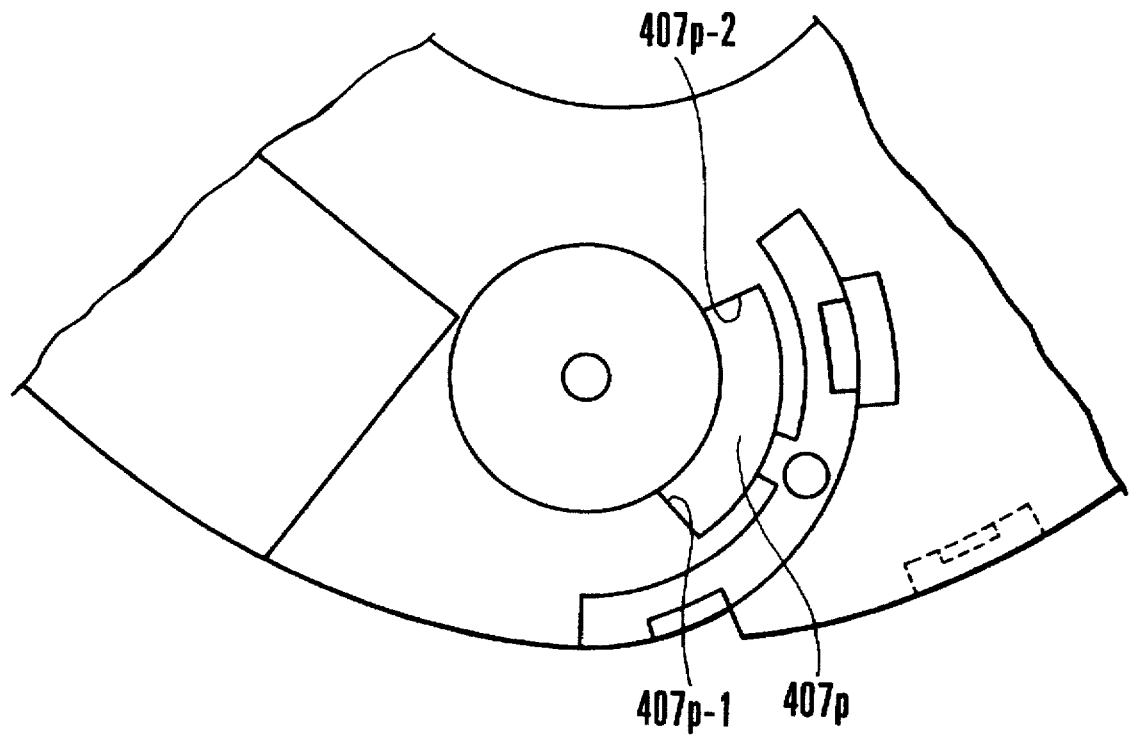
FIG. 21 is an enlarged plan view of a portion of the base plate 407 of FIG. 20.
Figure 22:
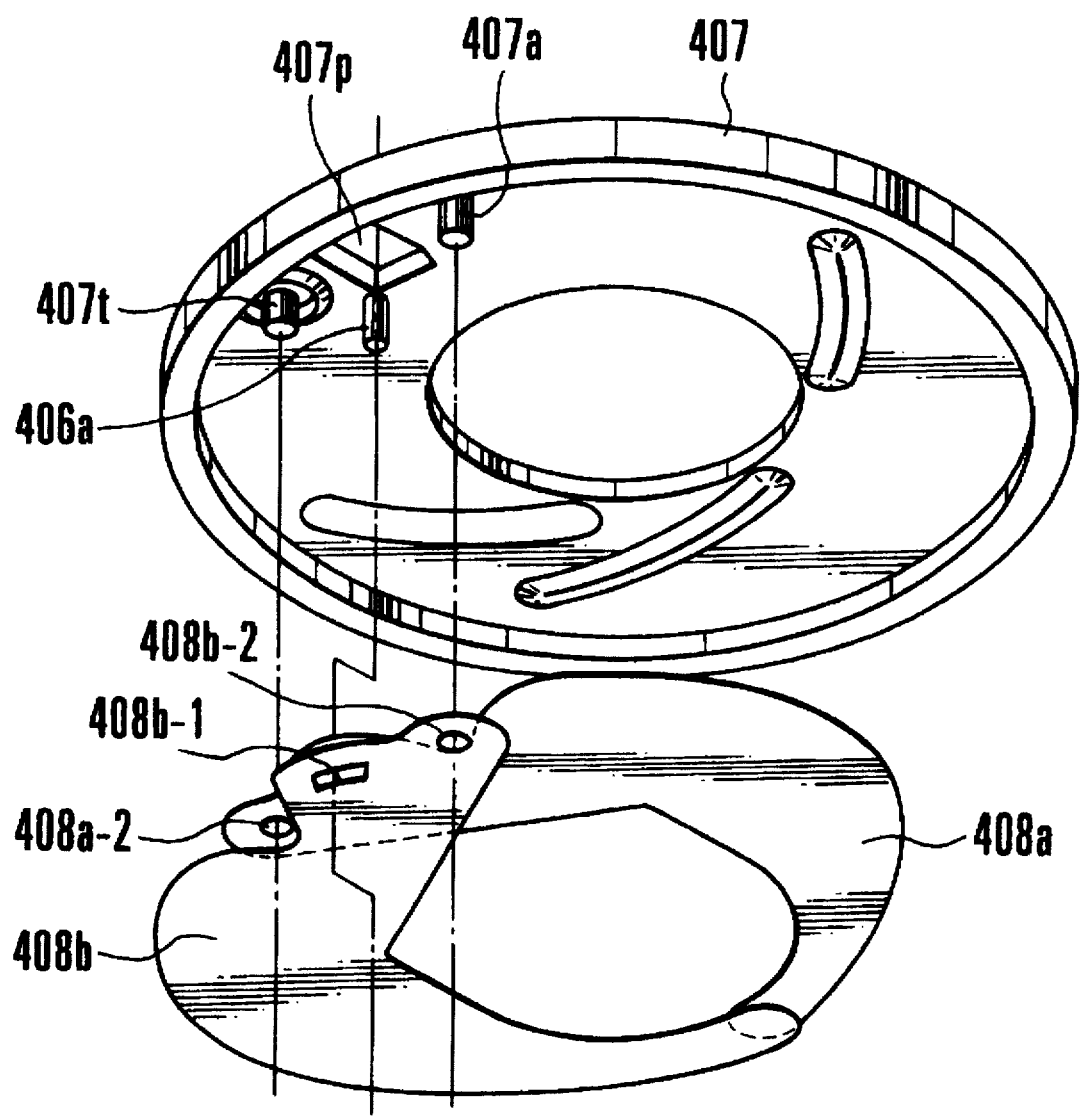
FIG. 22 is a diagrammatic, perspective view showing the diaphragm members and the base plate of the amount-of-light adjusting device shown in FIG. 19.

A recess 407h which is shallow and square in plan view is formed in close proximity to the groove 407g of the base plate 407 on the side of the base plate 407 opposed to the stator 402. The recess 407h serves as a portion for positioning and fixing the bobbin 404 of the stator 402. A recess 407d which is circular in plan view is formed on the same side of the base plate 407 in close proximity to the projection 407e which is curved in plan view. A bearing hole 407a for rotatably supporting the shaft 401c of the rotor 401 is formed in the center of the recess 407d to extend through the base plate 407. The disk 406 is disposed in the recess 407d, and the shaft 401c of the rotor 401 is inserted into the bearing hole 407a. The window 407p having an arcuate shape along the peripheral edge of the recess 407d is formed in the base plate 407, and the arm 406a of the disk 406 is inserted into the window 407p. The arm 406a is relatively slidably inserted into the slots 408a-1 and 408b-1 of the respective diaphragm blades 408a and 408b. As shown in FIG. 21, opposite ends 407p-1 and 407p-2 of the window 407p serve as stoppers for determining the turning limits of the arm 406a of the disk 406 (i.e., determining the rotating limits of the rotor 401). The circumferential length of the window 407p is selected to correspond to a central angle of 50° relative to the axis of the rotor 401.

Pins 407t and 407u for pivotally securing the respective diaphragm blades 408a and 408b project from the face of the base plate 407 opposite to the stator 402 in the vicinity of the window 407p. The pin 407t is inserted into the pin hole 408a-2 of the diaphragm blade 408a, while the pin 407u is inserted into the pin hole 408b-2 of the diaphragm blade 408b.

Recesses 407m, 407r and 407s for engagement with claws or engagement pieces 409a, 409b and 409c of the cover 409 are respectively formed at three locations of the peripheral face of the base plate 407.

As shown in FIG. 19, the actuator end plate 405 has a shape which corresponds to the shape of the stator 402 in plane view. The actuator end plate 405 has four legs for mounting the actuator end plate 405 to the base plate 407 (in FIG. 19, only the three legs 405j, 405g and 405h are shown), the holes 405b and 405c through which to insert the respective coil connecting terminals 404a and 404b, a bearing hole 405a into which to insert the shaft 401b of the rotor 401, the pin holes 405d and 405e into which to insert the respective pins 407b and 407c, the window 405f through to insert the Hall element 410, a circuit board engagement piece 405k to be inserted into a hole 411a formed in the circuit beard 411, and the like.

The circuit beard 411 has holes 411b for allowing the lead wires 410a of the Hall element 410 to be inserted therethrough and connected to the wiring formed on the circuit beard 411, the holes 411c and 411d for allowing the respective coil connecting terminals 404a and 404b to be inserted therethrough and fixed by soldering, the circuit board engagement hole 411a into which to insert the circuit board engagement piece 405k projecting from the actuator end plate 405, and the like. The circuit board 411 is engaged with the actuator end plate 405 by the circuit board engagement piece 405k.

Figure 23:
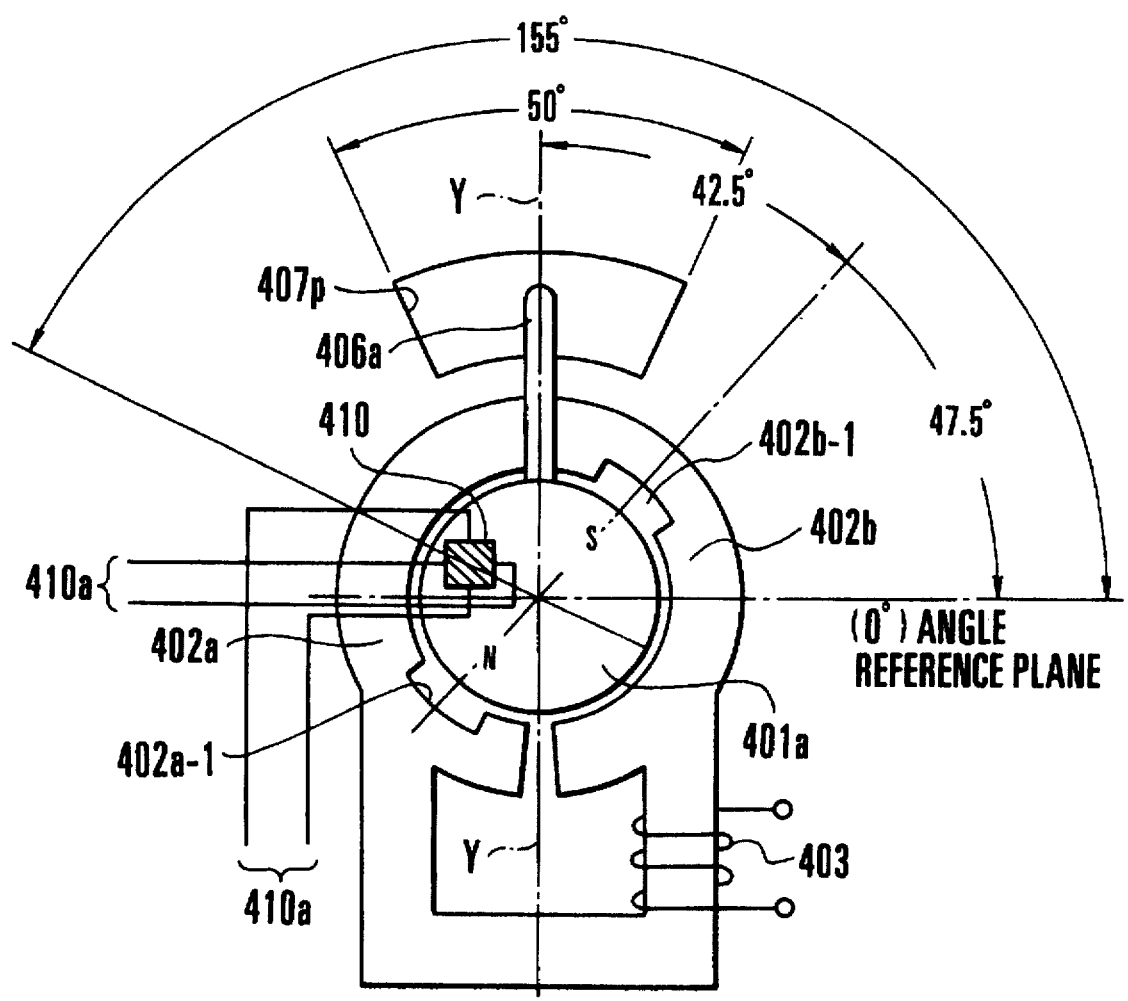
FIGS. 23 and 24 are schematic views of the electromagnetic actuator portion, aiding in explaining the distinctive structure of the amount-of-light adjusting device according to the present invention.

As shown in FIGS. 19 through 23, large gaps, i.e., circumferential grooves 402a-1 and 402b-1 are respectively formed in the internal faces of the semi-cylindrical portions of the yokes 402a and 402b at symmetrical locations with respect to the axis of the rotor 401. That is to say, the circumferential groove 402b-1 of the yoke 402b is provided at a position which is rotated by 42.5° in the clockwise direction from a longitudinal central line Y of the stator 402 (the first quadrant in FIG. 23), while the circumferential groove 402a-1 of the yoke 402a is provided at a position which is spaced 180° apart from the circumferential groove 402b-1 (the third quadrant in FIG. 23). When the rotor 401 is rotated up to the center of the turning range, the arm 406a of the disk 406 mounted on the rotor 401 is positioned on the longitudinal central line Y of the stator 402 (in the longitudinal central position of the window 407p of the base plate 407 as shown in FIG. 23).

The location of the circumferential grooves 402a-1 and 402b-1 of the respective yokes 402a and 402b and the circumferential length of the window 407p of the base plate 407 are determined in relation to the driving characteristics of the rotor 401. The following description is made in connection with the location of the circumferential grooves 402a-1 and 402b-1 and the circumferential length of the window 407p as well as the location of the Hall element 410.

Figure 24:
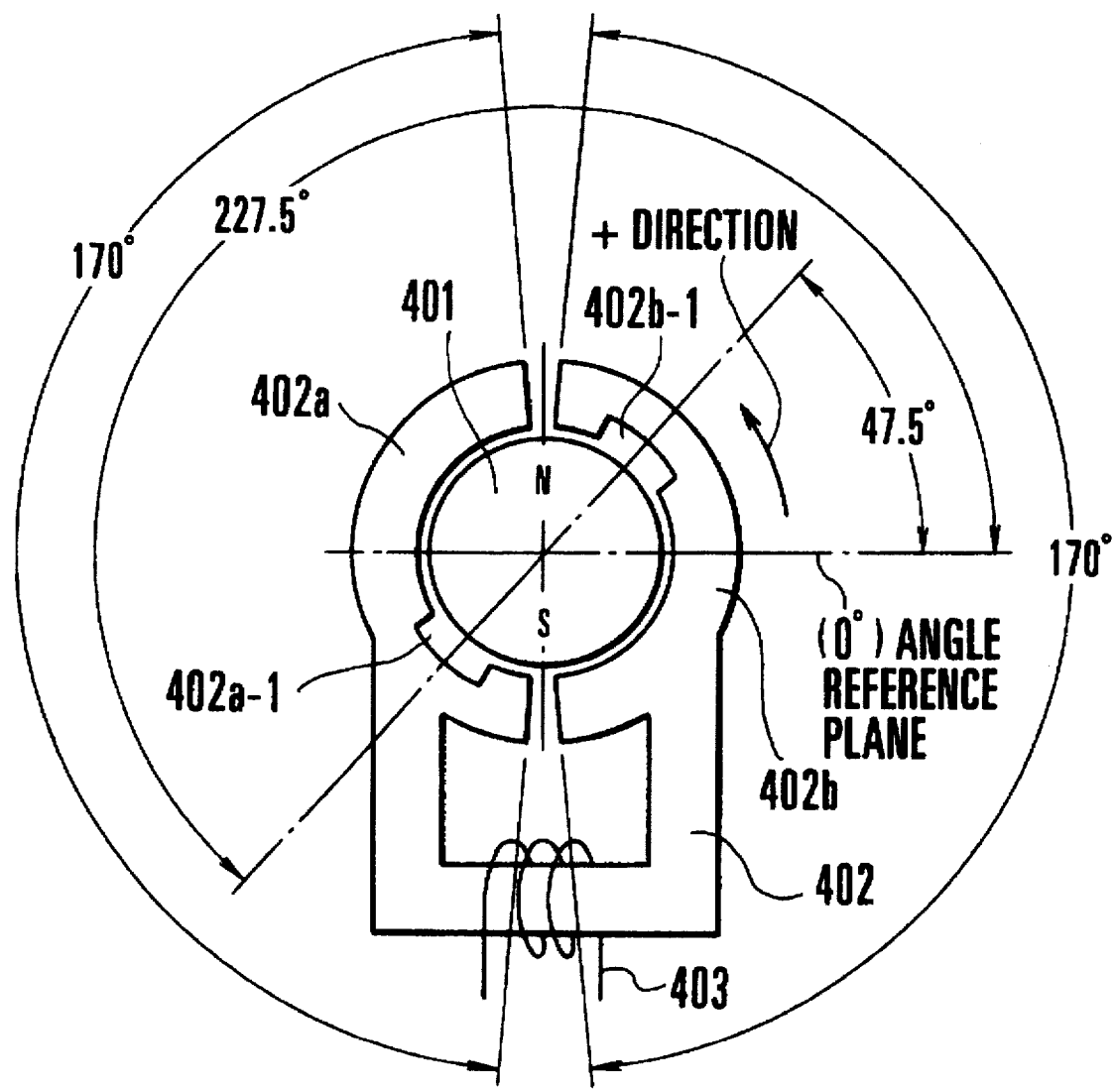

As shown in FIG. 23, the Hall element 410 is disposed at a central angle of 155° which is measured about the axis of the rotor 401 in the counterclockwise direction (+direction) from a reference plane which is a plane perpendicular to the longitudinal central line Y of the stator 402 and passing through the rotor 401. The reason for this will be described below with reference to FIGS. 24 and 25. If the rotor 401 is made to make one rotation in the +direction (counterclockwise direction as viewed in FIG. 24) from the state in which the plane (reference plane), which is perpendicular to the longitudinal central line Y of the stator 402 and passes through the rotor 401, is coincident with the boundary between the N- and S-pole areas of the rotor 401 (i.e., a line passing through the axis of the rotor 401), the torque characteristics shown in FIG. 25 are obtained.

Figure 25:
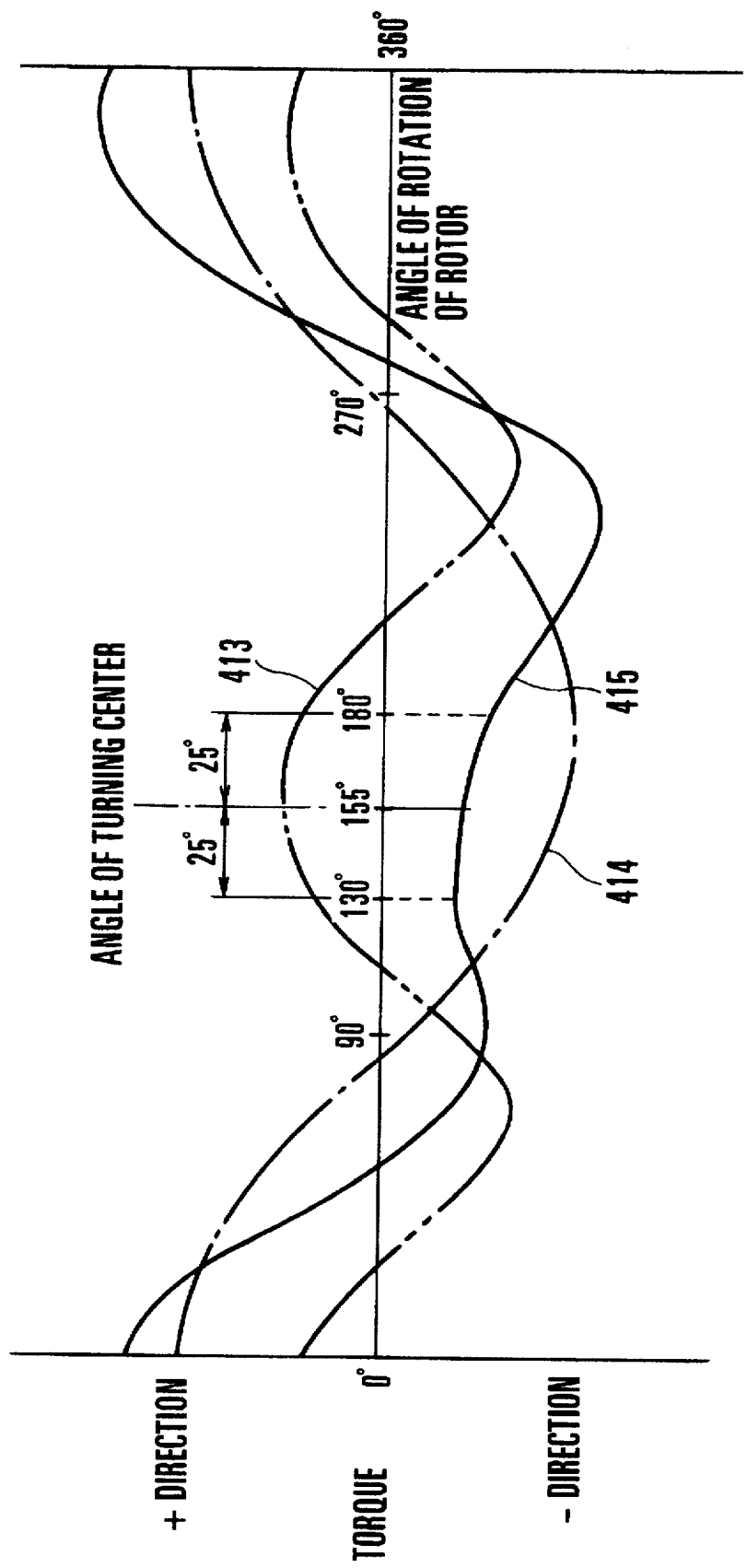
FIG. 25 is a toque characteristic chart of the rotor of the electromagnetic actuator portion.

In FIG. 25, a curve 413 indicates a cogging torque (i.e., braking torque), a curve 414 indicates a driving torque generated by a coil current, and a curve 415 indicates the total torque which represents the sum of the cogging torque and the driving torque. Referring to FIG. 25, it can be seen that an area of approximately ±45° centered at 155° forms the range of rotational angles of the rotor 401 in which the cogging torque can work over its entire range to cause the rotor 401 to rotate in one direction, whereas the total torque, which represents the sum of the cogging torque and the driving torque, can work over its entire range to cause the rotor 401 to rotate in the other direction.

Accordingly, it is understood that if an area of ±25° centered at 155° measured from the reference plane is selected as the turning range of the rotor 401, the rotor 401 can be driven most efficiently.

For the above-described reason, in the amount-of-light adjusting device according to the present invention, the circumferential length of the window 407p which determines the turning range of the rotor 401 is selected to be a length corresponding to a central angle of 50° about the axis of the rotor 401.

When the rotor 401 is positioned in the center of its turning range, the boundary between the magnetized faces of the rotor 401 (the boundary between the N- and S-pole areas of the rotor 401) is positioned at the aforesaid central angle of 155°. For this reason, the Hall element 410 is disposed at the central angle of 155°. Accordingly, since the Hall element 410 is disposed at the boundary between the N- and S-pole areas, it is possible to detect highly accurately the rotational movement of the rotor 401.

Figure 16:
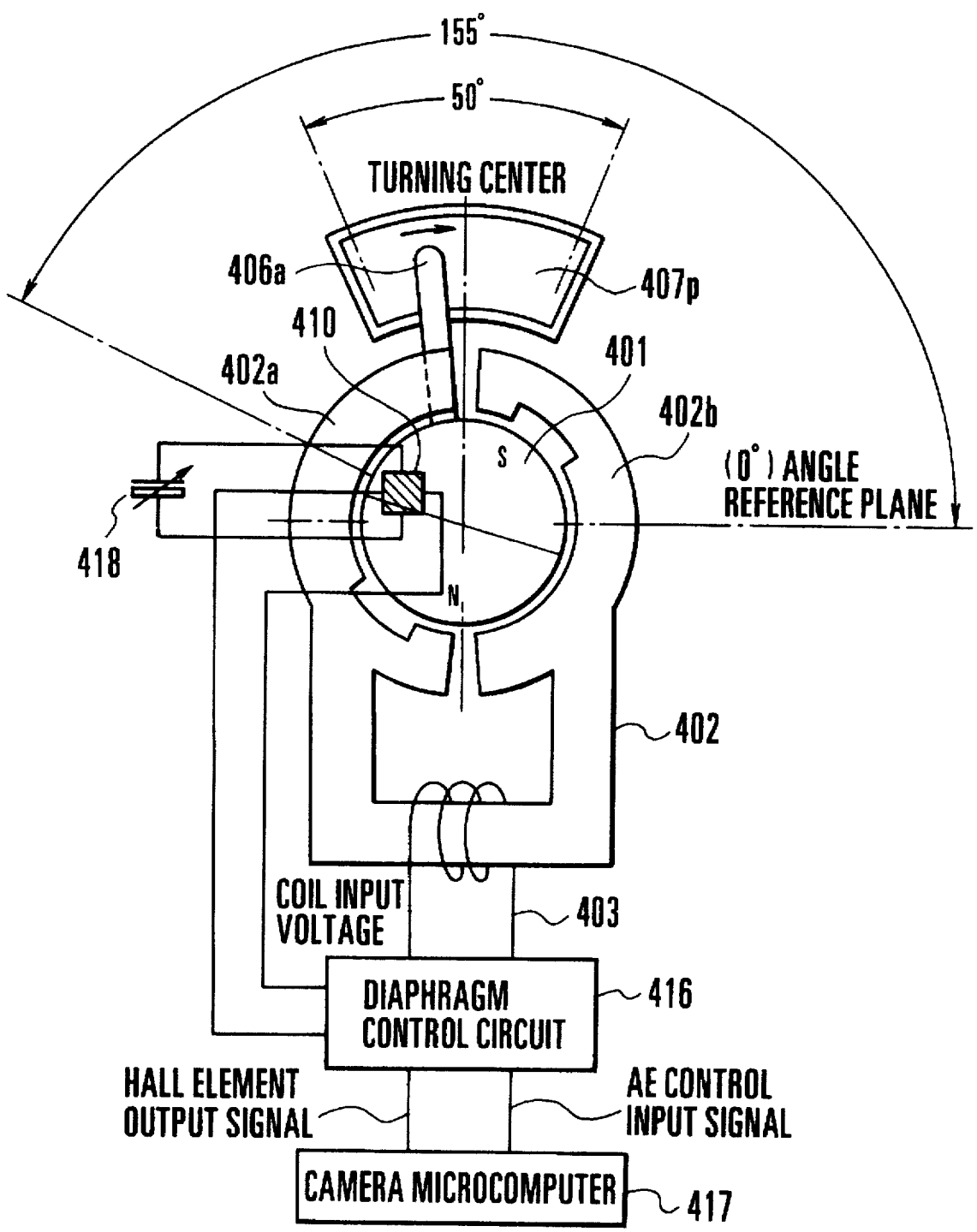
FIG. 16 is a schematic view showing a state in which the coil is energized in the electromagnetic actuator portion shown in FIG. 15.
Figure 17:
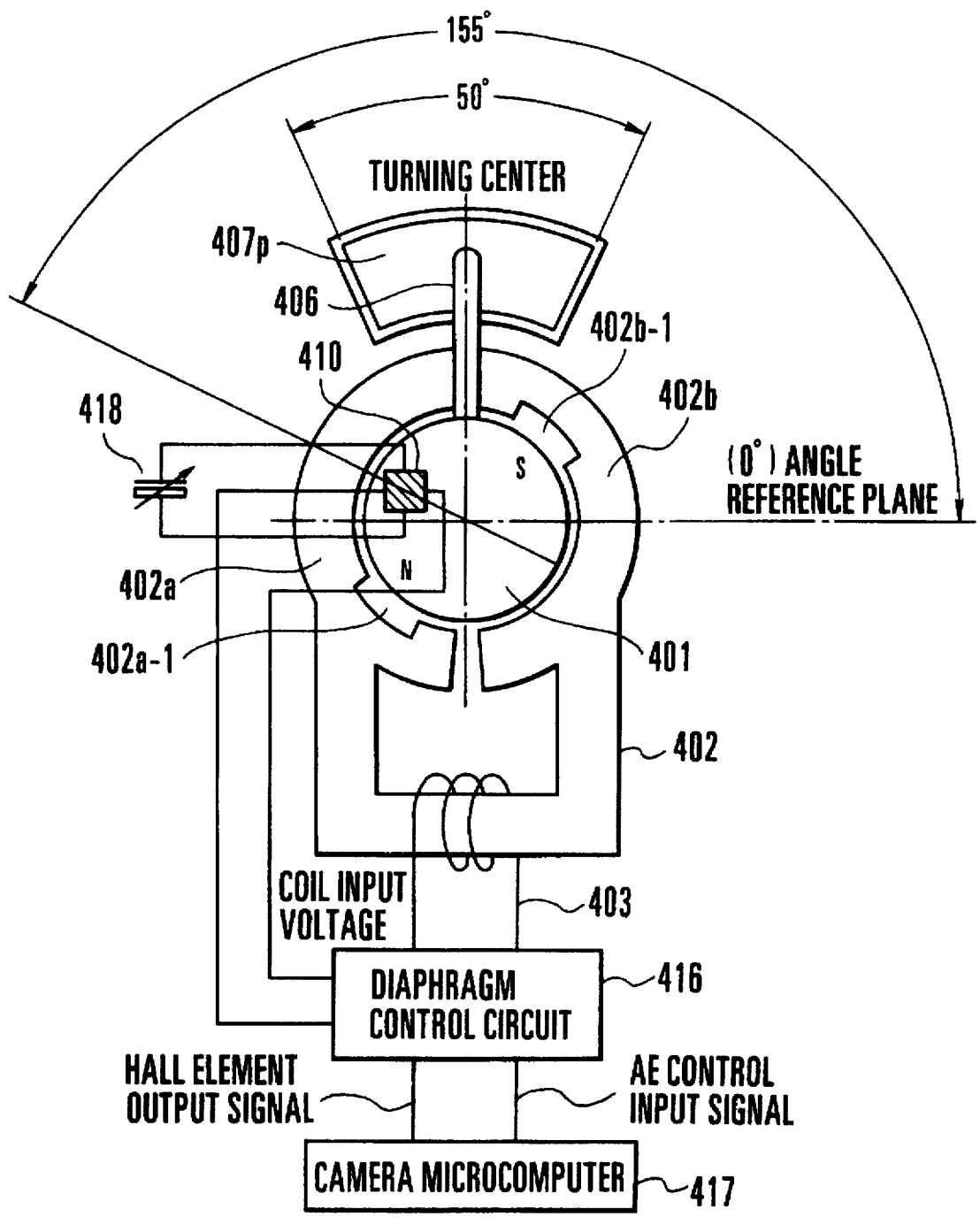
FIG. 17 is a schematic view showing a state in which the coil is energized in the electromagnetic actuator portion shown in FIG. 15 and a rotor 401 is rotated up to the center of its turnable range.

FIGS. 15 through 17 are schematic views showing an electromagnetic actuator portion of the amount-of-light adjusting device which is improved according to the present invention.

Referring to FIGS. 15 through 17, a diaphragm control circuit 416 is provided for controlling voltage to be applied to the coil 403, a camera microcomputer 417 (a microcomputer incorporated in a camera or the like) is provided for controlling the diaphragm control circuit 416, and a detector power source 418 is provided for driving the Hall element 410. The camera microcomputer 417 determines an optimum exposure condition on the basis of the output of a light measuring device (not shown), and transmits an exposure control (AE) signal which satisfies the optimum exposure condition to the diaphragm control circuit 416. The diaphragm control circuit 416 controls the voltage to be applied to the coil 403 on the basis of the exposure control signal and also detects the rotational position of the rotor 401 (i.e., the aperture size of the diaphragm) on the basis of the output signal of the Hall element 410 to adjust the voltage to be applied to the coil 403.

FIG. 15 shows a de-energized state in which no voltage is applied to the coil 403. In this state, the arm 406a of the disk 406 mounted on the rotor 401 abuts against the left end of the window 407p of the base plate 407. During this time, the arm 406a is pressed against the left end of the window 407p by the cogging torque of the rotor 401 (which acts as a torque tending to cause the rotor 401 to rotate in the counterclockwise direction as viewed in FIG. 15), while the diaphragm blades 408a and 408b are urged in the diaphragm closing direction by the arm 406a and the diaphragm aperture is closed.

When the exposure control signal (AE control signal) is inputted to the diaphragm control circuit 416 from the camera microcomputer 417, the diaphragm control circuit 416 applies an appropriate voltage to the coil 403 on the basis of the exposure control signal, thereby energizing the coil 403 to cause the rotor 401 to rotate in the clockwise direction against the cogging torque.

Then, when the rotor 401 moves from the deenergized position of FIG. 15 through the position of FIG. 16 to the central position of the rotor turning range shown in FIG. 17, the boundary between the S- and N-pole areas of the rotor 401 is positioned above the Hall element 410. Accordingly, a large variation in magnetic field occurs around the Hall element 410, and the Hall element 410 generates an output voltage according to the variation in magnetic field.

Figure 18:
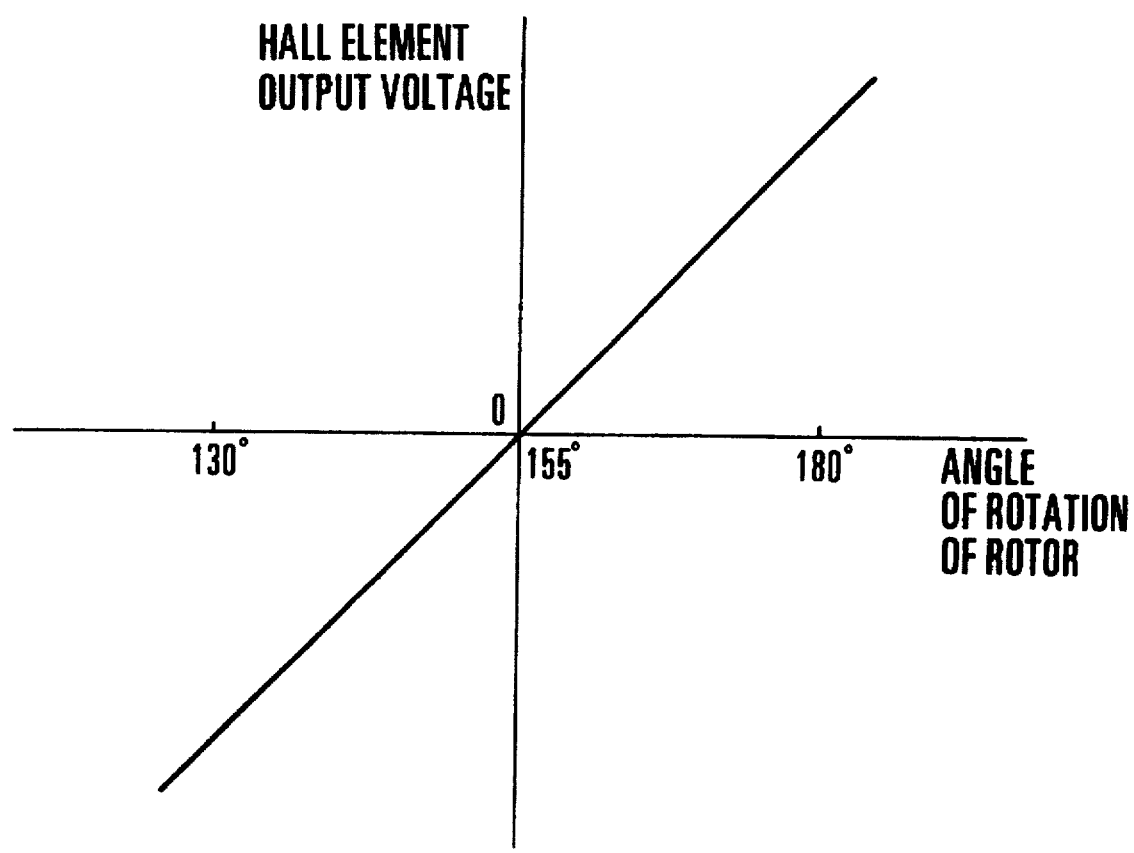
FIG. 18 is a graph showing the relationship between the angle of rotation of the rotor 401 and the output voltage of a Hall element 410 in the electromagnetic actuator portion shown in FIGS. 15 to 17.

FIG. 18 shows the relationship (within the turning range determined by the window 407p) between the output of the Hall element 410 and the angle of rotation of the rotor 401 in the amount-of-light adjusting device according to the present invention. As shown in FIG. 18, in the amount-of-light adjusting device according to the present invention, the output of the Hall element 410 linearly varies with respect to the angle of rotation of the rotor 401. This indicates that the Hall element 410 highly accurately detects the angle of rotation of the rotor 401.

As is apparent from the above description, in the amount-of-light adjusting device according to the present invention, since a position detecting element for detecting the position of the rotor is disposed on the boundary between the magnetic poles of the rotor of the electromagnetic actuator, it is possible to detect highly accurately the rotational position of the rotor. Accordingly, it is possible to provide an amount-of-light adjusting device capable of effecting more accurate exposure control than conventional similar kinds of amount-of-light adjusting devices.

Although in the above-described third embodiment the position detecting element for detecting the position of the rotor is disposed opposite to one end face of the rotor, such position detecting element may also be disposed opposite to the peripheral face of the rotor.

What is claimed is:

1. An optical apparatus comprising:

a) a light-blocking member arranged to move to vary a light-blocking area;

b) drive means for driving said light-blocking member, said drive means including a stator and a rotor, said stator formed by a first stator arm having a first rotor opposed portion and a second stator arm having a second rotor opposed portion, said rotor made eccentric with respect to a central position of said first stator arm and said second stator arm, said first and second rotor opposed portions having portions having different air gaps relative to said rotor; and c) an optical system, at least said stator and said rotor of said drive means being disposed rearward of said light-blocking member in the direction of an optical axis of said optical system.

2. An optical apparatus according to claim 1, wherein said rotor is disposed at an eccentric position deviated toward the optical axis from the central position of said first stator arm and said second stator arm.

3. An optical apparatus according to claim 1, wherein said drive means has a case member for housing said stator and said rotor, said case member.

4. An optical apparatus according to claim 3, wherein said support member holds a lens which constitutes part of said optical system.

5. An optical apparatus according to claim 3, wherein said support member supports a motor for driving a movable lens in said optical system.

6. An amount-of-light adjusting device comprising:
 a) a light-blocking member arranged to move to vary a light-blocking area of an opening; and
 b) drive means for driving said light-blocking member, said drive means including a coil, a rotor and a stator formed by a first stator arm having a first rotor opposed portion and a second stator arm having a second rotor opposed portion, said first stator arm formed in an approximately linear shape in a vicinity of said first rotor opposed portion and said second stator arm formed in an approximately arcuate shape in a vicinity of said second rotor opposed portion, said first and second rotor opposed portions having portions having different air gaps relative to said rotor.

7. An amount-of-light adjusting device according to claim 6, wherein said coil is secured to said first stator arm.

8. An amount-of-light adjusting device according to claim 6, wherein said second stator piece in said drive means is disposed closer to said opening than said first stator arm is.

9. An amount-of-light adjusting device comprising:
 a) a plurality of light-blocking members arranged to move to vary a light-blocking area of an opening;
 b) a drive unit for driving said plurality of light-blocking members; and
 c) a support member for supporting said plurality of light-blocking members and said drive unit,
 said support member movably supporting said plurality of light-blocking members, when said support member is brought into a predetermined posture, said plurality of light-blocking members are moved by their gravity to a position at which said plurality of light-blocking members are connectable with said drive unit.

10. An amount-of-light adjusting device according to claim 9, wherein said support member has limiting means for limiting positions of said plurality of light-blocking members, said plurality of light-blocking members being supported by said support member and being limited to the position at which said plurality of light-blocking members can be connected to said drive unit, by their own weights and by said limiting means.

11. An amount-of-light adjusting device suitable for use in a optical apparatus having an optical system, comprising:
 a) a light-blocking member arranged to move to vary a light-blocking area; and
 b) drive means for driving said light-blocking member, said drive means including a stator and a rotor, said stator formed by a first stator arm having a first rotor opposed portion and a second stator arm having a second rotor opposed portion, said rotor made eccentric with respect to a central position of said first stator arm and said second stator arm, said first and second rotor opposed portions having portions having different air gaps relative to said rotor,
 at least said stator and said rotor in said drive means being disposed rearward of said light-blocking member in the direction of an optical axis of said optical system.

12. An amount-of-light adjusting device according to claim 11, wherein said rotor is disposed at an eccentric position deviated toward the optical axis from the central position of said first stator arm and said second stator arm.

13. An amount-of-light adjusting device according to claim 11, wherein said support member holds a lens which constitutes part of said optical system.

14. An amount-of-light adjusting device according to claim 11, wherein said support member supports a motor for driving a movable lens in said optical system.

15. An amount-of-light adjusting device comprising:
 a) a light-blocking member arranged to move to vary a light-blocking area;
 b) a drive unit including a drive source, an output member brought into contact with said light-blocking member and a case for housing the drive source, said case having first limiting means for limiting a moving range of said output member; and
 c) a support member for supporting said light-blocking member and said case, said support member including second limiting means for limiting a moving range of said output member,
 the moving range of said output member limited by said second limiting means being selected to be equal to or less than the moving range of said output member limited by said first limiting means.

16. An amount-of-light adjusting device according to claim 15, wherein said drive unit has a guide member for guiding said drive unit to a position at which said support member is to support said drive unit; when said drive unit is to be secured to said support member, said guide member guides said drive unit to the position at which said support member is to support said drive unit, before said output member makes contact with said light-blocking member.

17. An amount-of-light adjusting device according to claim 15, wherein said second limiting means is positioned closer to said light-blocking member than said first limiting means is.

18. An optical apparatus comprising:
 a) a stator;
 b) a coil secured to said stator;
 c) a rotor having a surface magnetized to have a plurality of poles;
 d) a case into which at least said coil is accommodated;
 e) an optical member arranged to be driven by said rotor; and
 f) a printed circuit board connectable to said coil, an opening through which a terminal of said coil connectable to said printed circuit board is inserted being provided on a side of said case on which no rotation of said rotor is outputted, and a projection for providing a standard position for connecting said printed circuit board having a predetermined height being provided in an edge portion of said opening.

19. An amount-of-light adjusting device comprising:
 a) a stator;
 b) a coil secured to said stator;
 c) a rotor having a surface magnetized to have a plurality of poles;
 d) magnetism detecting means for detecting a rotational position of said rotor; and
 e) a light-blocking member arranged to be driven by a rotation of said rotor, said light-blocking member being moved to vary a light-blocking area of an opening,
 an area in which a torque corresponding to a sum of a cogging torque of said rotor and a driving torque generated during energization of said coil exhibits a moderate variation being selected as a moving range of said rotor, said magnetism detecting means being disposed approximately at a central position of the moving range of said rotor.

20. An amount-of-light adjusting device according to claim 19, wherein said magnetism detecting means is disposed approximately at the central position of an area in which a direction of the torque corresponding to the sum of the cogging torque of said rotor and the driving torque generated during energization of said coil is different from a direction of the cogging torque of said rotor.

21. An amount-of-light adjusting device comprising:

a) a light-blocking member arranged to move to vary a light-blocking area of an opening;

b) drive means for driving said light-blocking member, said drive means including a coil, a rotor and a stator formed by a first stator arm having a first rotor opposed portion and a second stator arm having a second rotor opposed portion, said first stator arm formed in an approximately linear shape and said second stator arm formed in an approximately arcuate shape in a vicinity of said second rotor opposed portion, said first and second rotor opposed portions having portions having different air gaps relative to said rotor; and c) a detection element for detecting the rotation of said rotor being positioned near said second rotor opposed portion.

22. An amount-of-light adjusting device comprising:

a) a light-blocking member arranged to move to vary a light-blocking area of an opening;

b) drive means for driving said light-blocking member, said drive means including a coil, a rotor and a stator formed by a first stator arm having a first rotor opposed portion and a second stator arm having a second rotor opposed portion, said first stator arm formed in an approximately linear shape and said second stator arm formed in an approximately arcuate shape in a vicinity of said second rotor opposed portion, said first and second rotor opposed portions having portions having different air gaps relative to said rotor;

c) a case member for housing said coil, said rotor and said stator; and d) a support member for supporting said light-blocking member and said case member.

23. A device according to claim 22, wherein said case member is provided with a holding portion for holding said stator.

24. A device according to claim 23, wherein said holding portion is formed in a hook-shape.

25. A device according to claim 22, wherein said case member is provided with an engagement hook for engagement with said support member.

26. An amount-of-light adjusting device comprising:

a) a plurality of light-blocking members arranged to move to vary a light-blocking area of an opening;

b) a drive unit for driving said plurality of light-blocking members; and c) a support member for supporting said plurality of light-blocking members and said drive unit, said support member provided with a support portion for supporting rotatably said plurality of light-blocking members near a support portion of said drive unit.

27. A device according to claim 26, wherein said drive unit has a connecting member which connects with at least one of said plurality of light-blocking members and said support member is provided with a hole through which said connecting member passes.

* * * * *

UNITED STATES PATENT AND TRADEMARK OFFICE
CERTIFICATE OF CORRECTION

PATENT NO. : 5,689,746
DATED : November 18, 1997
INVENTOR(S) : Akada et. al

It is certified that error appears in the above-identified patent and that said Letters Patent is hereby corrected as shown below:

Col. 6, line 10, delete "arm stator" and insert -- stator arm --.

Col. 9, line 35, delete "beard" and insert -- board --.

Col. 15, line 53, delete "dieter" and insert -- diameter --.

Col. 20, line 67, delete "member." and insert -- member supported by a common support member by which said light-blocking member is supported. --.

Signed and Sealed this

Twelfth Day of May, 1998

Attest:

BRUCE LEHMAN

Attesting Officer

Commissioner of Patents and Trademarks